US012563469B2

(12) United States Patent
Nam et al.

(10) Patent No.: US 12,563,469 B2
(45) Date of Patent: Feb. 24, 2026

(54) ELECTRONIC DEVICE AND ROAMING METHOD

(71) Applicant: SAMSUNG ELECTRONICS CO., LTD., Suwon-si (KR)

(72) Inventors: Chounjong Nam, Suwon-si (KR); Sungbin Min, Suwon-si (KR); Changmok Yang, Suwon-si (KR); Sunkee Lee, Suwon-si (KR); Eonji Lee, Suwon-si (KR); Mincheol Jeong, Suwon-si (KR); Junyeop Jung, Suwon-si (KR); Junsu Choi, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 467 days.

(21) Appl. No.: 18/095,303

(22) Filed: Jan. 10, 2023

(65) Prior Publication Data

US 2023/0232293 A1 Jul. 20, 2023

Related U.S. Application Data

(63) Continuation of application No. PCT/KR2022/015440, filed on Oct. 12, 2022.

(30) Foreign Application Priority Data

Jan. 14, 2022 (KR) ........................ 10-2022-0005971
Mar. 18, 2022 (KR) ........................ 10-2022-0034193

(51) Int. Cl.
*H04W 36/24* (2009.01)
*H04W 36/00* (2009.01)
*H04W 36/08* (2009.01)

(52) U.S. Cl.
CPC ....... *H04W 36/24* (2013.01); *H04W 36/0094* (2013.01); *H04W 36/08* (2013.01)

(58) Field of Classification Search
CPC ............. H04W 36/08; H04W 36/0094; H04W 36/00837
See application file for complete search history.

(56) References Cited

U.S. PATENT DOCUMENTS

| 8,089,939 B1 | 1/2012 | Mater et al. | |
| 2008/0146230 A1* | 6/2008 | Pandian | H04W 36/0016 455/445 |

(Continued)

FOREIGN PATENT DOCUMENTS

| CN | 109275198 A | 1/2019 |
| EP | 4145947 A1 | 3/2023 |

(Continued)

OTHER PUBLICATIONS

Huawei, 'TID-to-Link Mapping Negotiation', IEEE 802.11-20/1551r2, Dec. 17, 2020; Slides 2-7. URL: https://view.officeapps.live.com/op/view.aspx?src=https%3A%2F%2Fmentor.ieee.org%2F802.11%2Fdcn%2F20%2F11-20-1551-02-00be-tid-to-link-mapping-negotiation.pptx&wdOrigin=BROWSELINK.

(Continued)

*Primary Examiner* — Melanie Jagannathan

(74) *Attorney, Agent, or Firm* — CANTOR COLBURN LLP

(57) ABSTRACT

An electronic device includes a wireless communication module configured to transceive a wireless signal, a processor operatively connected to the wireless communication module, and a memory electrically connected to the processor and configured to store instructions executable by the processor, wherein, when the instructions are executed by the processor, the processor is configured to determine whether roaming is triggered by a roaming trigger while (Continued)

forming a plurality of links with and connected to an access point (AP), determine a state of the plurality of links by responding to the roaming trigger, and differentiate and perform roaming operations according to the state of the plurality of links. In addition, various embodiments may be possible.

18 Claims, 14 Drawing Sheets

(56)            References Cited

U.S. PATENT DOCUMENTS

| | | | |
|---|---|---|---|
| 2011/0267969 A1* | 11/2011 | Ceccherini | H04W 36/00837 370/252 |
| 2015/0098392 A1 | 4/2015 | Homchaudhuri et al. | |
| 2016/0255549 A1* | 9/2016 | Lakhdhar | H04W 36/0094 370/332 |
| 2017/0013493 A1* | 1/2017 | HomChaudhuri | H04W 36/0085 |
| 2017/0171833 A1* | 6/2017 | Vamaraju | H04W 48/16 |
| 2018/0191572 A1 | 7/2018 | Ben-Haim et al. | |
| 2019/0223101 A1* | 7/2019 | Li | H04W 52/0229 |
| 2020/0015140 A1* | 1/2020 | Nam | H04W 36/0061 |
| 2020/0037392 A1* | 1/2020 | Qui | H04L 67/535 |
| 2021/0014811 A1 | 1/2021 | Seok et al. | |
| 2021/0014911 A1 | 1/2021 | Patil et al. | |
| 2021/0068171 A1 | 3/2021 | Hsu et al. | |
| 2022/0248364 A1* | 8/2022 | Stager | H04W 8/005 |

FOREIGN PATENT DOCUMENTS

| | | | |
|---|---|---|---|
| WO | 2021002618 A1 | 1/2021 | |
| WO | 2021091231 A1 | 5/2021 | |
| WO | 2021238823 A1 | 12/2021 | |
| WO | 2021251696 A1 | 12/2021 | |

OTHER PUBLICATIONS

Intel; "MLD Transition", IEEE 802.11-20/0669r5, Sep. 9, 2020; Slides 2-5. URL: https://view.officeapps.live.com/op/view.aspx?src=https%3A%2F%2Fmentor.ieee.org%2F802.11%2Fdcn%2F20%2F11-20-0669-05-00be-mld-transition.optx&wdOrigin=BROWSELINK.

International Search Report for International Application No. PCT/KR2022/015440; International Filing Date Oct. 12, 2022; International Search Report Mail Date Jan. 18, 2023; 3 Pages.

European Extended Search Report corresponding to Application No. 22920760.0-1215; Dated Jan. 28, 2025.

* cited by examiner

ELECTRONIC DEVICE AND ROAMING METHOD

CROSS-REFERENCE TO RELATED APPLICATIONS

This application is a continuation application of International Application No. PCT/KR2022/015440 designating the United States, filed on Oct. 12, 2022, in the Korean Intellectual Property Receiving Office and claiming priority to Korean Patent Application No. 10-2022-0034193, filed on Mar. 18, 2022, and Korean Patent Application No. 10-2022-0005971, filed on Jan. 14, 2022, in the Korean Intellectual Property Office, the disclosures of which are incorporated by reference herein in their entireties.

BACKGROUND

1. Field

The disclosure relates to an electronic device and a roaming method.

2. Description of Related Art

An electronic device may provide functions, such as a voice call, a video call, video streaming, or the Internet. Various functions provided by the electronic device may be provided by a mobile communication method or a wireless communication method.

The wireless communication method may include wireless fidelity (Wi-Fi). Wi-Fi is wireless local area network technology, which enables an electronic device to access the Internet in a frequency band of substantially 2.4 gigahertz (GHz), substantially 5 GHz, or substantially 6 GHz. The electronic device may be connected to a network (e.g., a Wi-Fi network) through an access point (AP). Since a coverage of the AP may be limited, the electronic device may perform seamless wireless communication by roaming from a currently connected AP to another AP according to movement of the electronic device.

SUMMARY

Roaming (e.g., inter access point (AP) roaming) may refer to a series of operations of connecting to at least one other AP while being connected to and communicating with at least one AP. When an electronic device moves a certain distance away from a currently connected AP due to movement of the electronic device or when a communication state with the currently connected AP degrades due to other reasons (e.g., interference) while the electronic device communicates with the currently connected AP, the electronic device may perform scanning to find at least one other AP, and when an AP is found that meets a designated requirement, the electronic device may generate a new connection seamlessly with the new AP. The roaming operation described above only considers a case in which there is 1 Wi-Fi link, so an unnecessary or unexpected operation may occur. A roaming operation, which considers a plurality of Wi-Fi links, may be required.

Embodiments of the disclosure may provide technology for differentiating roaming operations according to the state of a plurality of links between the electronic device and an AP.

The technical goals to be achieved are not limited to those described above, and other technical goals not mentioned above are clearly understood by one of ordinary skill in the art from the following description.

According to one embodiment, an electronic device includes a wireless communication module configured to transceive a wireless signal, a processor operatively connected to the wireless communication module, and a memory electrically connected to the processor and configured to store instructions executable by the processor, wherein, when the instructions are executed by the processor, the processor is configured to determine whether roaming is triggered by a roaming trigger while forming a plurality of links with and connected to an AP, determine a state of the plurality of links by responding to the roaming trigger, and differentiate and perform roaming operations according to the state of the plurality of links.

According to one embodiment, a method of operating an electronic device includes determining whether roaming is triggered by a roaming trigger while forming a plurality of links with and connected to an AP, determining a state of the plurality of links by responding to the roaming trigger, and differentiating and performing roaming operations according to the state of the plurality of links.

Embodiments may efficiently perform a roaming operation, in a state in which a plurality of links is formed, by differentiating and performing roaming operations according to the state of the plurality of links.

Embodiments may enable a user to continuously use wireless fidelity (Wi-Fi) without trouble according to a differentiation of roaming operations.

In addition, various effects directly or indirectly ascertained through the present disclosure may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
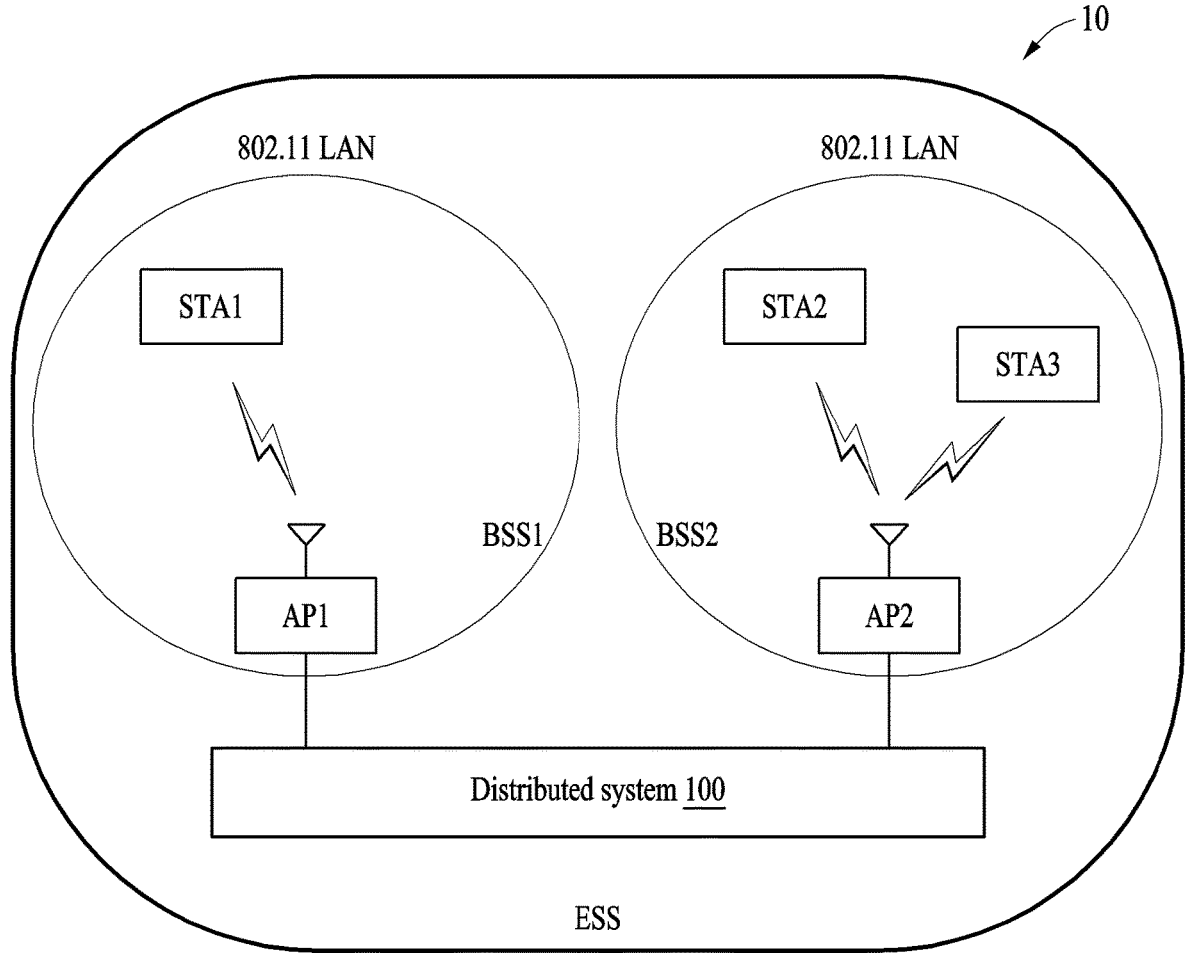
FIG. 1 illustrates an example of a wireless local area network (LAN) system according to one embodiment.

Hereinafter, embodiments will be described in detail with reference to the accompanying drawings. When describing the embodiments with reference to the accompanying drawings, like reference numerals refer to like constituent elements and a repeated description related thereto will be omitted.

FIG. 1 illustrates an example of a wireless local area network (WLAN) system according to one embodiment.

Referring to FIG. 1, according to one embodiment, a WLAN system 10 may be in an infrastructure mode in which an access point (AP) is present in a WLAN structure conforming to an institute of electrical and electronic engineers (IEEE) 802.11 standard. The WLAN system 10 may include at least one basic service set (BSS), for example, BSS1 and BSS2. The BSS1 or BSS2 may be a set of an AP and a station (STA, e.g., an electronic device 1301, 1302, or 1304 of FIG. 13), which may successfully synchronize with each other to communicate with each other. The BSS1 may include AP1 and STA1, and the BSS2 may include two or more STAs, for example, STA2 and STA3 that may be combined with one AP (e.g., AP2).

According to one embodiment, the WLAN system 10 may include at least one STA (e.g., STA1 to STA3), an AP (e.g., AP1 and AP2) that provides a distribution service, and a distribution system 100 that connects a plurality of APs (e.g., AP1 and AP2). The distribution system 100 may implement an extended service set (ESS) by connecting a plurality of BSSs (e.g., BSS 1 and BSS 2). The ESS may be used as a term to denote one network including one or more AP (e.g., AP1 and AP2) connected via the distribution system 100. The APs (e.g., AP1 and AP2) included in one ESS may have the same service set identification (SSID).

According to one embodiment, the STAs (e.g., STA1 to STA3) may include a medium access control (MAC) and a wireless-medium physical layer interface conforming to the IEEE 802.11 standard. The term "STA" may be used to collectively refer to both an AP and a non-AP STA. The STA may also be referred to by various terms, such as an "electronic device", a "mobile terminal", a "wireless device", a "wireless transmit/receive unit (WTRU)", a "user equipment (UE)", a "mobile station (MS)", and a "mobile subscriber unit", or may simply referred to as a "user".

Figure 2:
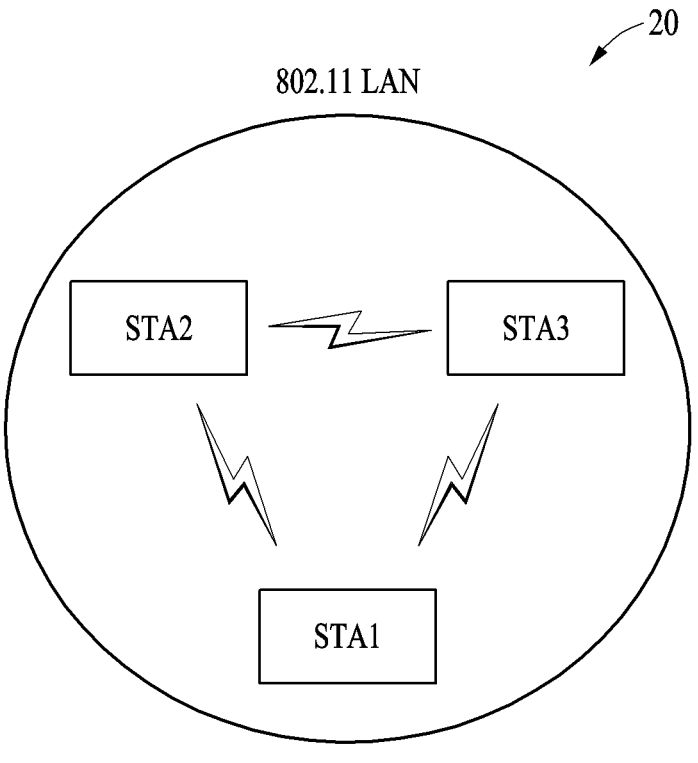
FIG. 2 illustrates another example of a wireless LAN system according to one embodiment.

FIG. 2 illustrates another example of a wireless LAN system according to one embodiment.

Referring to FIG. 2, according to one embodiment, a WLAN system 20 may be in an ad-hoc mode in which communication is performed by setting a network between STAs without an AP in a structure of a WLAN of the IEEE 802.11 standard, unlike the WLAN system 10 of FIG. 1. The WLAN system 20 may include a BSS (not shown) operating in an ad-hoc mode, that is, an independent basic service set (IBSS).

According to one embodiment, since the IBSS does not include an AP, a centralized management entity that performs a management function at a center may not exist. In the IBSS, STAs may be managed in a distributed manner. According to an embodiment, in the IBSS, all STAs may be mobile STAs, and a stand-alone network (or, a self-contained network) may be configured since an access to a distribution system (e.g., the distribution system 100 of FIG. 1) is not allowed.

Figure 3:
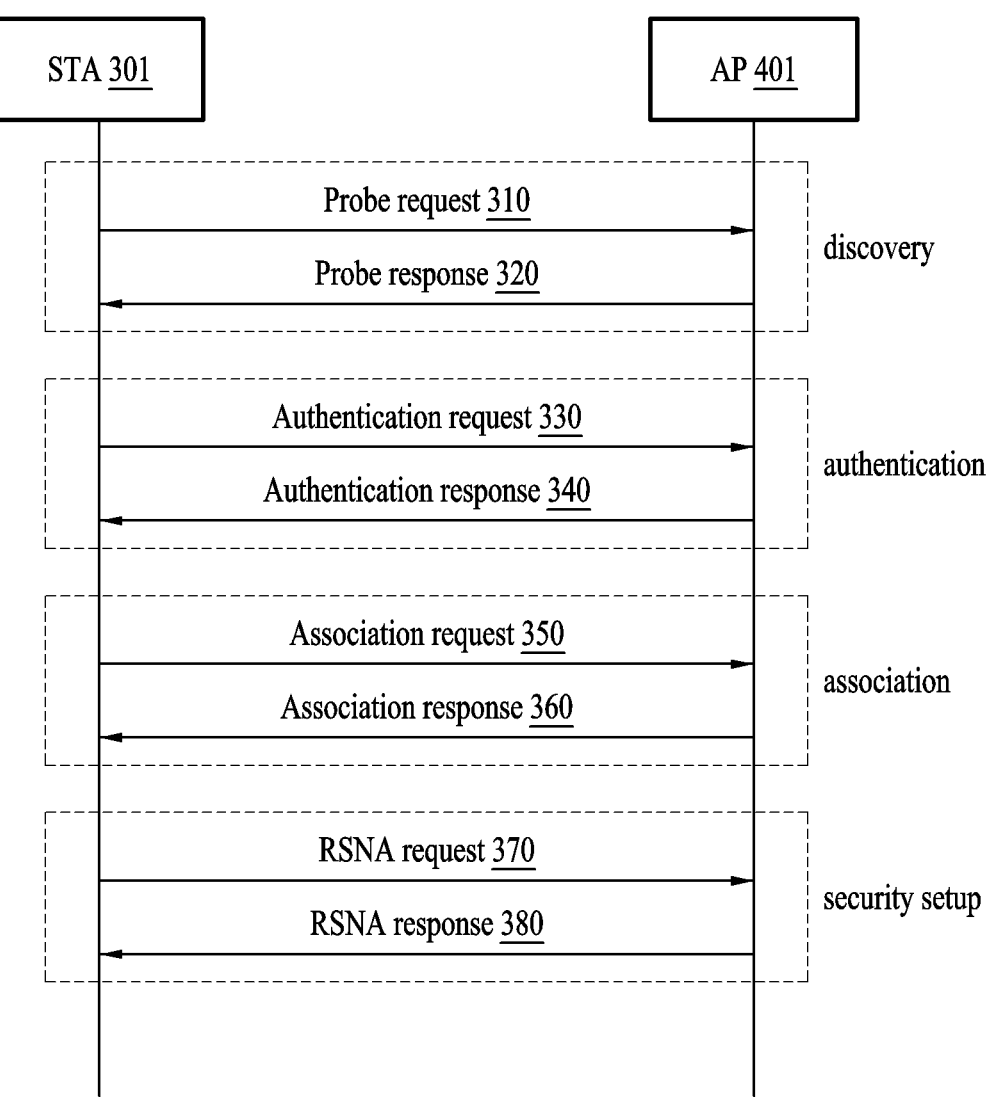
FIG. 3 is a diagram illustrating a link setup operation according to one embodiment.

FIG. 3 is a diagram illustrating a link setup operation according to one embodiment.

Referring to FIG. 3, according to one embodiment, a link setup operation may be performed between devices (e.g., an STA 301 and an AP 401) to communicate with each other. For link setup, a network may be discovered, authentication may be performed, association may be established, and a setup operation for security may be performed. The link setup operation may also be referred to as a "session initiation operation" or a "session setup operation". Also, discovery, authentication, association, and security setup operations in the link setup operation may be collectively referred to as an "association operation."

According to one embodiment, a network discovery operation may include operations 310 and 320. In operation 310, the STA 301 (e.g., the electronic device 1601, 1602, or 1604 of FIG. 16) may transmit a probe request frame to probe which AP is present and may wait for a response to the probe request frame. The STA 301 may find a network to participate in by performing a scanning operation to access the network. The scanning operation may include an active scanning operation and a passive scanning operation. In operation 320, the AP 401 may transmit, to the STA 301 that transmits the probe request frame, a probe response frame in response to the probe request frame.

According to one embodiment, after the STA 301 discovers the network, an authentication operation including operations 330 and 340 may be performed. In operation 330, the STA 301 may transmit an authentication request frame to the AP 401. In operation 340, the AP 401 may determine whether to allow authentication for the STA 301 based on information included in the authentication request frame. The AP 401 may provide the STA 301 with a result of an authentication process through an authentication response frame. An authentication frame used for authentication request/response may correspond to a management frame.

According to one embodiment, the authentication frame may include information on an authentication algorithm number, an authentication transaction sequence number, a status code, challenge text, a robust security network (RSN), or a finite cyclic group.

According to one embodiment, after the STA 301 has successfully authenticated, an association operation including operations 350 and 360 may be performed. In operation 350, the STA 301 may transmit an association request frame to the AP 401. In operation 360, the AP 401 may transmit an association response frame to the STA 301 in response to the association request frame.

According to one embodiment, the association request frame and/or the association response frame may include information related to various capabilities. For example, the association request frame may include information related to various capabilities, such as a beacon listen interval, an SSID, a supported rate, a supported channel, an RSN, a mobility domain, a supported operating class, a traffic indication map (TIM) broadcast request, and/or information related to an interworking service capability. For example, the association response frame may include information related to various capabilities, such as a status code, an association identifier (AID), a supported rate, an enhanced distributed channel access (EDCA) parameter set, a received channel power indicator (RCPI), a received signal to noise indicator (RSNI), a mobility domain, a timeout interval (e.g., an association comeback time), a overlapping BSS scan parameter, a TIM broadcast response, and/or information such as a Quality of Service (QoS) map.

According to one embodiment, after the STA 301 has successfully associated with the network, a security setup operation including operations 370 and 380 may be performed. The security setup operation may be performed using a robust security network association (RSNA) request/response. For example, the security setup operation may include a private key setup operation through four-way handshaking using an extensible authentication protocol over LAN (EAPOL) frame. The security setup operation may be performed by a security scheme that is not defined in the IEEE 802.11 standard.

According to one embodiment, a security session may be set between the STA 301 and the AP 401 based on the security setup operation, and the STA 301 and the AP 401 may perform secure data communication.

Figures 4, 5:
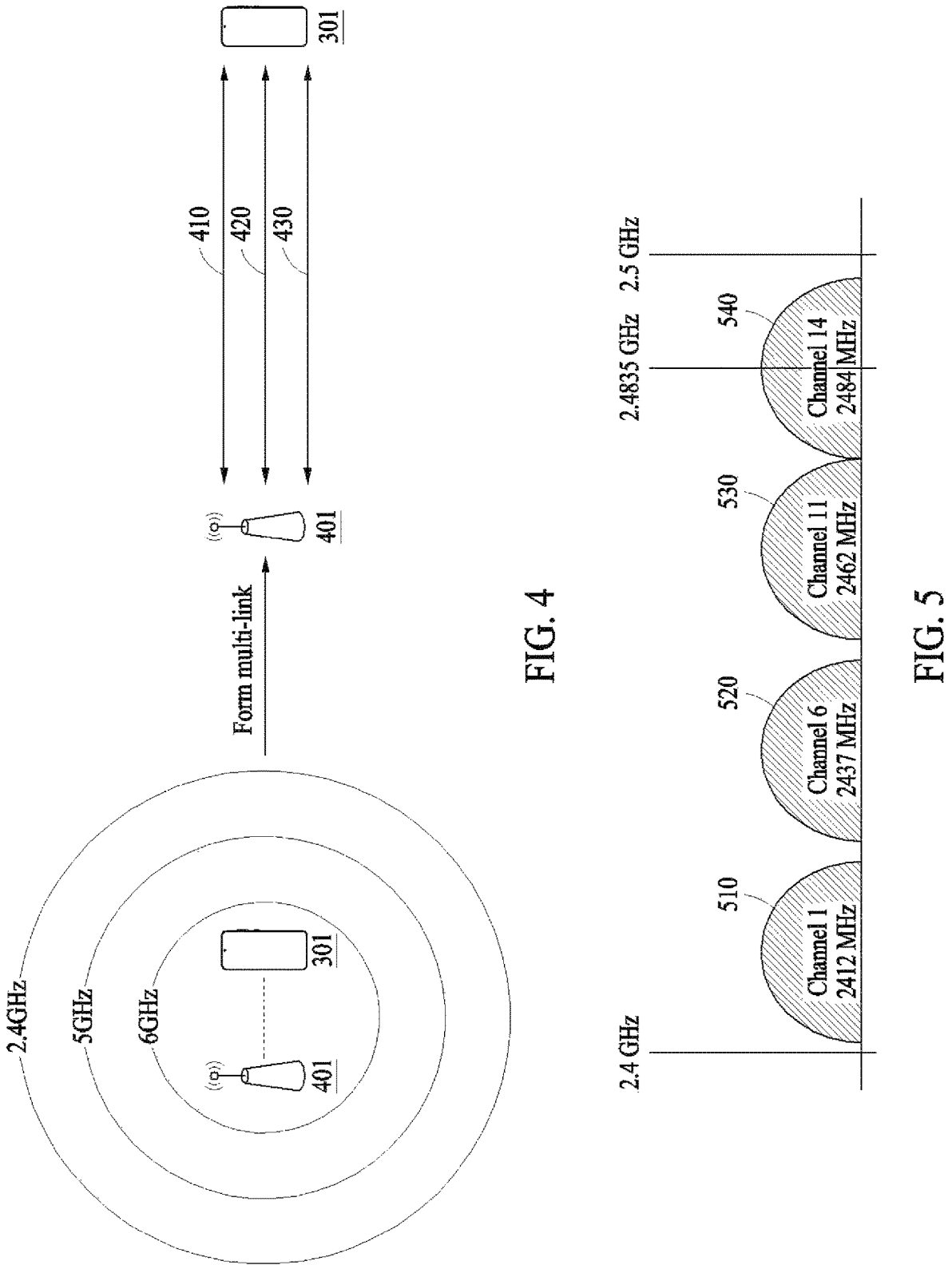
FIG. 4 is a diagram illustrating multi-link communication according to one embodiment.
FIG. 5 illustrates an example of a channel, which is used/supported/defined within a substantially 2.4 gigahertz (GHz) band according to one embodiment.

FIG. 4 is a diagram illustrating multi-link communication according to one embodiment.

Referring to FIG. 4, devices (e.g., the STA 301 and the AP 401) may support multi-link (or multi-band) communication. Devices supporting multi-link communication (e.g., the STA 301 and the AP 401) may simultaneously perform communication through a plurality of links (e.g., a plurality of links 410 to 430). A link may include one channel (e.g., a channel having a bandwidth of substantially 20/40/80/160/240/320 megahertz (MHz)), which is defined in a substantially 2.4 gigahertz (GHz) band, substantially 5 GHz band, substantially 6 GHz band, and/or a designated band. Multi-link communication may refer to communication supporting a plurality of links (e.g., the plurality of links 410 to 430) and may refer to the STA 301 and the AP 401 performing communication simultaneously in a designated channel in a plurality of bands (e.g., the substantially 2.4 GHz band, substantially 5 GHz band, substantially 6 GHz band, and/or a designated band). The STA 301 and the AP 401 may perform multi-link communication supporting two or more of the substantially 2.4 GHz band, substantially 5 GHz band, substantially 6 GHz band, and/or a designated band.

According to one embodiment, the STA 301 may perform a scanning operation (e.g., scanning) for AP search in a channel (e.g., all channels) of the substantially 2.4 GHz band, substantially 5 GHz band, and substantially 6 GHz band. The STA 301 may consecutively perform a scanning operation on a band and may simultaneously perform a scanning operation on two or more bands.

According to one embodiment, the STA 301 may determine (e.g., discover) the AP 401 as the target AP (e.g., the target AP for access) among at least one candidate AP which is detected (or identified) through the scanning operation. Thereafter, an authentication operation (e.g., operations 330 and 340 of FIG. 3), an association operation (e.g., operations 350 and 360 of FIG. 3), and a security setup operation (e.g., operations 370 and 380 of FIG. 3) may be performed between the STA 301 and the AP 401, and the STA 301 may form a plurality of links 410 to 430 and communicate with the AP 401.

FIG. 5 illustrates an example of a channel, which is used/supported/defined within a substantially 2.4 GHz band according to one embodiment.

Referring to FIG. 5, the substantially 2.4 GHz band may refer to a frequency domain in which channels (e.g., a channel having a center frequency within substantially 2.4 to substantially 2.5 GHz) having a center frequency close to substantially 2.4 GHz are used/supported/defined. The substantially 2.4 GHz band may include a plurality of channels having a bandwidth of substantially 20 MHz. Each channel having a bandwidth of substantially 20 MHz within the substantially 2.4 GHz band may have a channel index (e.g., channel indices 1 to 14). For example, the center frequency of a channel having a substantially 20 MHz bandwidth to which channel index 1 is allocated may be substantially 2.412 GHz, the center frequency of a channel having a substantially 20 MHz bandwidth to which channel index 2 is allocated may be substantially 2.417 GHz, and the center frequency of a channel having a substantially 20 MHz bandwidth to which channel index N is allocated may be substantially (2.407+0.005*N) GHz. Channel index may be referred to as various names, such as a channel number. A specific value of the channel index and the center frequency may change.

FIG. 5 may show examples of 4 channels in the substantially 2.4 GHz band. A first frequency domain 510 to a fourth frequency domain 540 may each include one channel. For example, the first frequency domain 510 may include channel 1 (e.g., a channel having a substantially 20 MHz bandwidth and a first channel index) and the center frequency of channel 1 may be set as substantially 2412 MHz. The second frequency domain 520 may include channel 6, and the center frequency of channel 6 may be set as substantially 2437 MHz. The third frequency domain 530 may include channel 11, and the center frequency of channel 11 may be set as substantially 2462 MHz. The fourth frequency domain 540 may include channel 14, and the center frequency of channel 14 may be set as 2484 MHz.

Figure 6:
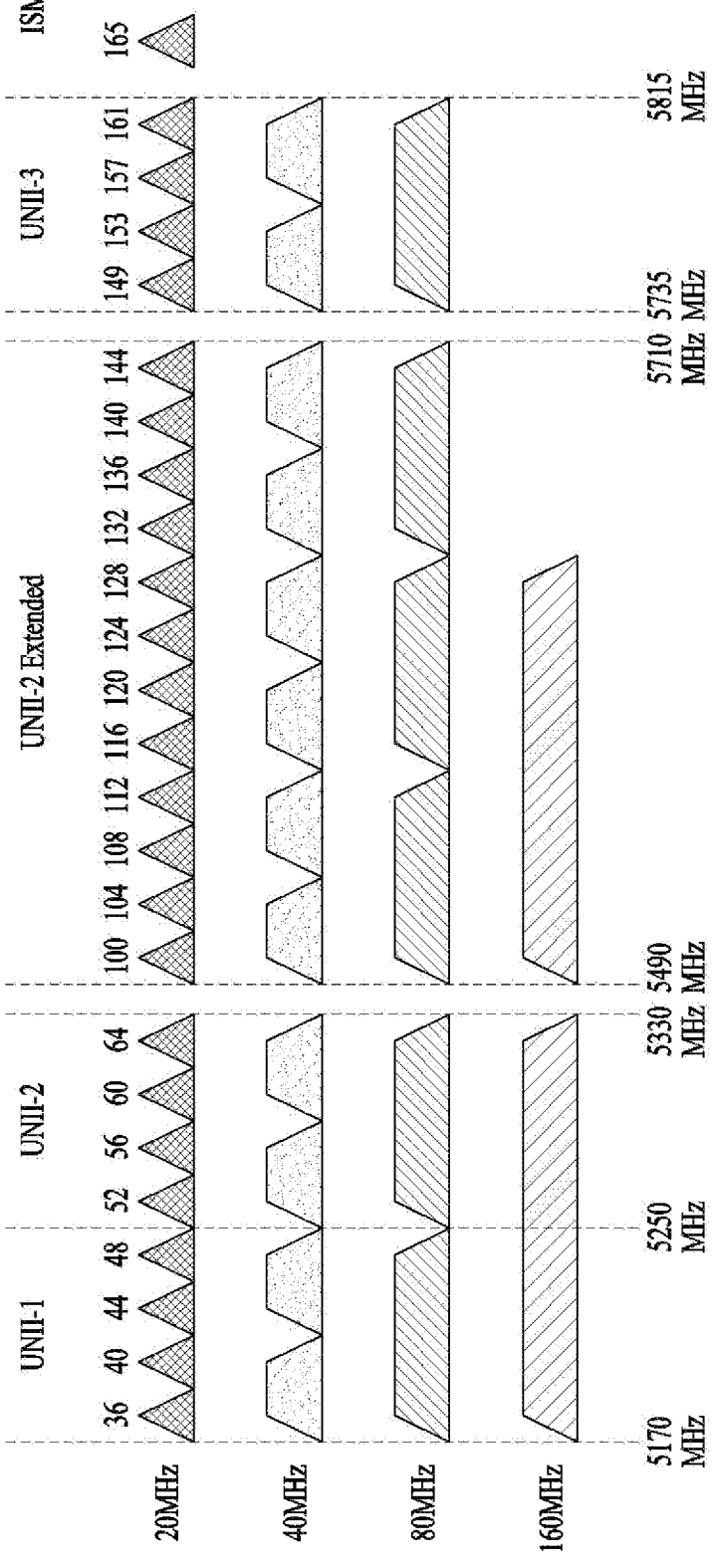
FIG. 6 illustrates an example of a channel, which is used/supported/defined within a substantially 5 GHz band according to one embodiment.

FIG. 6 illustrates an example of a channel, which is used/supported/defined within the substantially 5 GHz band according to one embodiment.

Referring to FIG. 6, the substantially 5 GHz band may refer to a frequency domain in which channels having a center frequency greater than or equal to substantially 5 GHz and less than substantially 6 GHz (or less than substantially 5.9 GHz) are used/supported/defined. Alternatively, the substantially 5 GHz band may include a plurality of channels between substantially 4.5 GHz and substantially 5.5 GHz. The specific values shown in FIG. 6 may change. The plurality of channels within the substantially 5 GHz band may include unlicensed national information infrastructure (UNII)-1, UNII-2, UNII-3, and industrial, scientific and medical (ISM). UNII-1 may be referred to as UNII Low. UNII-2 may include a frequency domain called UNII Mid and UNII-2Extended. UNII-3 may be referred to as UNII-Upper.

A plurality of channels may be set within the substantially 5 GHz band, and the bandwidth of each channel may be set differently, such as substantially 20 MHz, substantially 40 MHz, substantially 80 MHz, or substantially 160 MHz. For example, the frequency domain/range of substantially 5170 MHz to substantially 5330 MHz within UNII-1 and UNII-2 may be divided into eight substantially 20 MHz channels. The frequency domain/range of substantially 5170 MHz to substantially 5330 MHz may be divided into 4 channels through the substantially 40 MHz frequency domain. The frequency domain/range of substantially 5170 MHz to substantially 5330 MHz may be divided into 2 channels having an 80 MHz bandwidth. Alternatively, the frequency domain/ range of substantially 5170 MHz to substantially 5330 MHz may be divided into one channel having a 160 MHz bandwidth.

Figure 7:
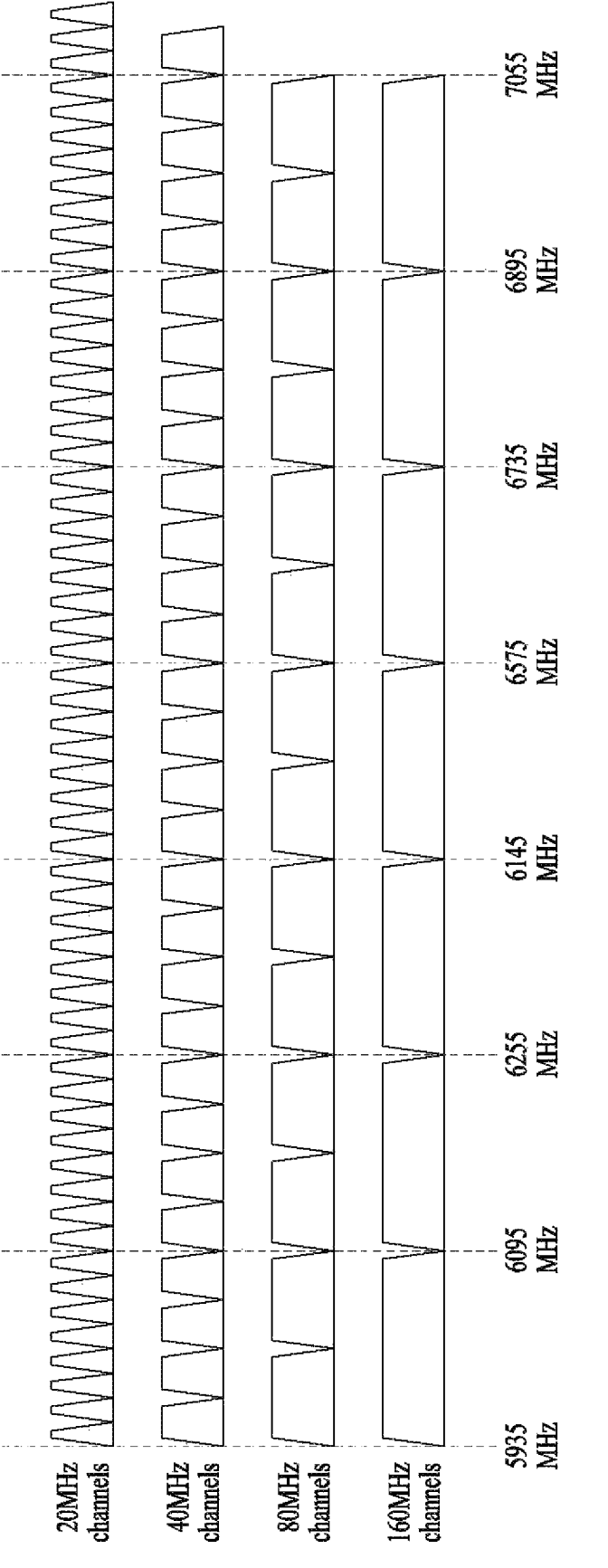
FIG. 7 illustrates an example of a channel, which is used/supported/defined within a 6 substantially GHz band according to one embodiment.

FIG. 7 illustrates an example of a channel, which is used/supported/defined within a 6 GHz band according to one embodiment.

Referring to FIG. 7, the substantially 6 GHz band may mean a frequency domain in which channels having a center frequency greater than or equal to substantially 5.9 GHz are used/supported/defined. A channel having a substantially 20 MHz bandwidth may be defined from 5.940 GHz. For example, among channels having a substantially 20 MHz bandwidth in FIG. 7, the leftmost channel may have a first channel index and the center frequency may be allocated as substantially 5.945 GHz. The center frequency of a channel having the channel index N may be determined to be substantially (5.940+0.005*N) GHz. The specific value shown in FIG. 7 may change.

In FIG. 7, the channel index of a channel having a substantially 20 MHz bandwidth may be, for example, 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, and 233. Also, the index of a channel having a substantially 40 MHz bandwidth in FIG. 7 according to the substantially (5.940+0.005*N) GHz principle stated above may be, for example, 3, 11, 19, 27, 35, 43, 51, 59, 67, 75, 83, 91, 99, 107, 115, 123, 131, 139, 147, 155, 163, 171, 179, 187, 195, 203, 211, 219, and 227.

A plurality of channels may be set within the substantially 6 GHz band, and the bandwidth of each channel may be set differently, such as substantially 20 MHz, substantially 40 MHz, substantially 80 MHz, or substantially 160 MHz. Although FIG. 7 shows channels having a bandwidth of substantially 20, substantially 40, substantially 80, or substantially 160 MHz, a channel having a substantially 240 MHz bandwidth or a channel having a substantially 320 MHz bandwidth.

Figure 8:
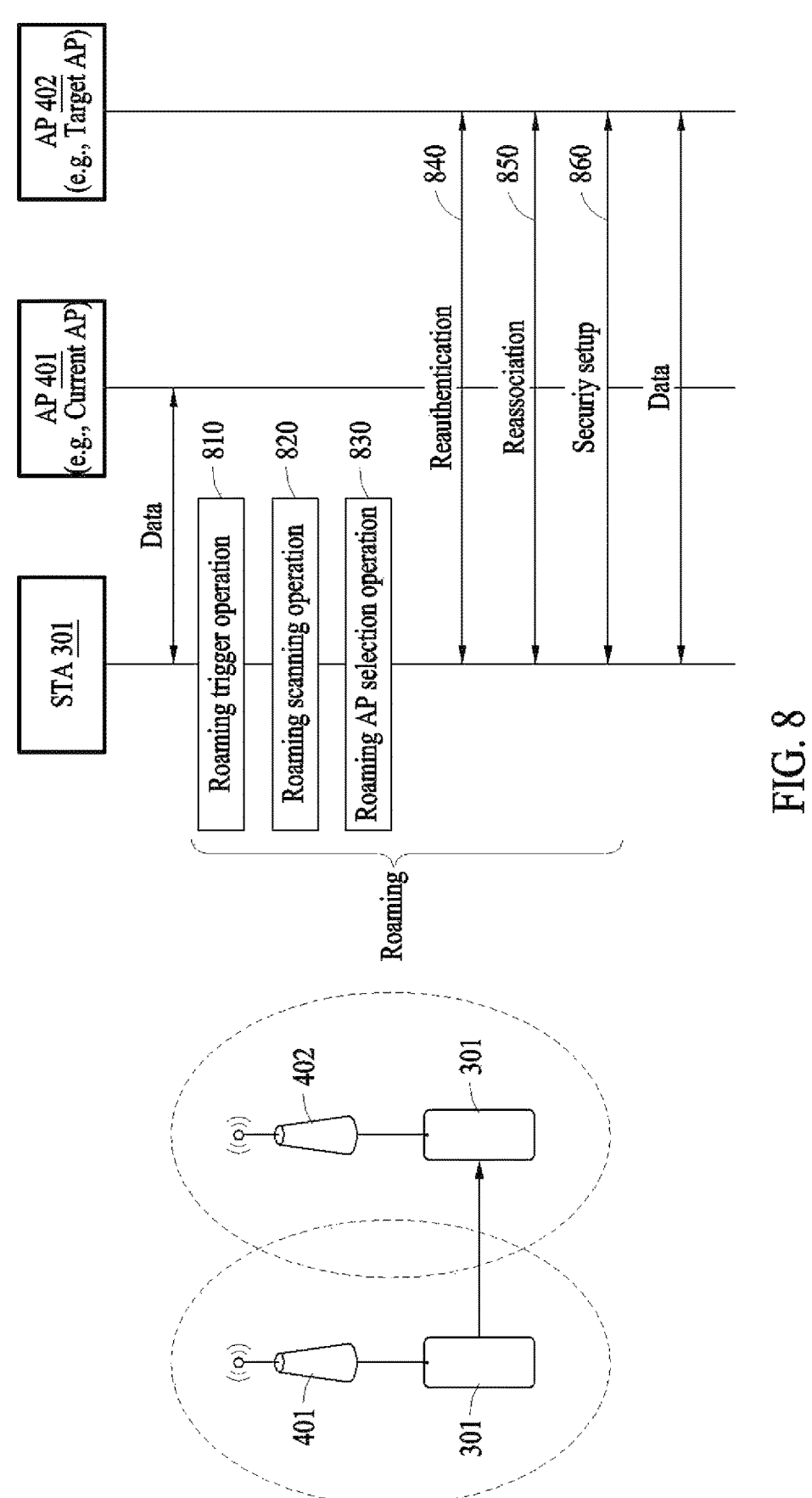
FIG. 8 is a diagram illustrating a roaming operation according to one embodiment.

FIG. 8 is a diagram illustrating a roaming operation according to one embodiment.

Referring to FIG. 8, according to one embodiment, the STA 301 may be connected to the network through an AP (e.g., an AP 401 and an AP 402). Since the coverage (e.g., a service coverage) of an AP (e.g., the AP 401) may be limited, the STA 301 may perform seamless wireless communication by roaming (e.g., inter AP roaming) from the currently connected AP (e.g., the AP 401) to another AP (e.g., an AP 402). The STA 301 may perform roaming when the distance with an AP (e.g., the AP 401) increases or when communication with an AP (e.g., the AP 401) degrades, such as due to interference.

According to one embodiment, roaming may refer to a series of operations (or processes) of switching the connection from a first AP to second AP while being connected to and communicating with the first AP, without disconnecting from the first AP. A roaming operation may include a roaming trigger operation (e.g., determining whether roaming is to be performed), a roaming scanning operation, an AP selection operation (e.g., selecting a target roaming AP), an authentication operation (e.g., operations 330 and 340 of FIG. 3), an association operation (e.g., operations 350 and 360), and a security setup operation (e.g., operations 370 and 380 of FIG. 3). Hereinafter, the roaming operation performed by the STA 301 is described in detail.

In operation 810, the STA 301 may determine whether roaming is triggered (e.g., whether roaming is to be performed) while communicating with the currently connected AP 401. The STA 301 may monitor parameters (e.g., the received signal strength indicator (RSSI), the transmission (Tx) error rate, the signal to noise ratio (SNR), and/or the like including combinations and/or multiples thereof) of the AP 401 and may determine that roaming is to be performed if the monitored parameter value is less than or equal to a designated threshold value (e.g., 75 decibel-milliwatts (dBm) in the case of RSSI).

In operation 820, the STA 301 may perform a roaming scanning operation to search for an accessible AP (e.g., an AP which supports roaming) for wireless communication connection other than the currently accessed AP 401 (e.g., the AP 402). The STA 301 may perform a full scan and/or a partial scan for searching for an AP in the substantially 2.4 GHz band, substantially 5 GHz band, and/or substantially 6 GHz band. A full scan may be a scan of all the available channels, and a partial scan may be a scan of at least one channel, not a scan of all available channels. The full scan and/or the partial scan may be performed on at least one designated band (e.g., the substantially 2.4 GHz band, the substantially 5 GHz band, and/or the substantially 6 GHz band). The STA 301 may perform a partial scan using a channel list (e.g., a roaming scan channel list), which is generated during the AP 401 connection. Also, the STA 301 may consecutively perform a roaming scanning operation on a band and may simultaneously perform a scanning operation on two or more bands.

In operation 830, the STA 301 may select a candidate AP, which meets the designated criteria, as the target roaming AP among at least one accessible AP found in the roaming scanning operation. The STA 301 may select a candidate AP (e.g., an AP which has an RSSI that is substantially 10 dBm higher than the currently connected AP 401, in the case of RSSI), which meets the criteria according to an AP selection criteria (e.g., parameters, such as RSSI, channel utilization, SNR, maximum link rate, and estimated throughput, channel, or band), among at least one found APs and determine a suitable AP (e.g., an AP with the highest RSSI) among the selected candidate APs as the target roaming AP 402. For example, the AP selection criteria may include parameters, such as RSSI, channel utilization, SNR, maximum link rate, or estimated throughput, and a score, which is calculated based on at least one of the above parameters. Also, the AP selection criteria may include selection and exclusion of a designated band and/or a designated channel for AP selection. If there is no candidate AP, the STA 301 may adjust one of the roaming scan period and roaming scan type (e.g., a full scan and a partial scan) to perform operation 820. According to an embodiment, the operation 830 can be performed iteratively until a suitable AP is identified.

In operation 840, after the STA 301 determines the target AP 402 that the STA 301 will perform roaming on (e.g., detect and select), an authentication operation (or a reauthentication operation) (e.g., operations 330 and 340 of FIG. 3) may be performed between the STA 301 and the target AP 402 upon which the STA 301 will perform roaming.

In operation 850, after the STA 301 is authenticated successfully, an association operation (or a re-association operation) (e.g., operations 350 and 360 of FIG. 3) may be performed between the STA 301 and the target AP 402.

In operation 860, after the STA 301 is successfully associated with the network, a security setup operation (e.g., operations 370 and 380 of FIG. 3) may be performed between the STA 301 and the target AP 402.

A security session may be set between the STA 301 and the AP 402 according to the security setup operation, and the STA 301 and the AP 402 may perform secure data communication. The AP 401 and the AP 402 may be included in one ESS and have the same SSID but are not limited thereto.

Figure 9:
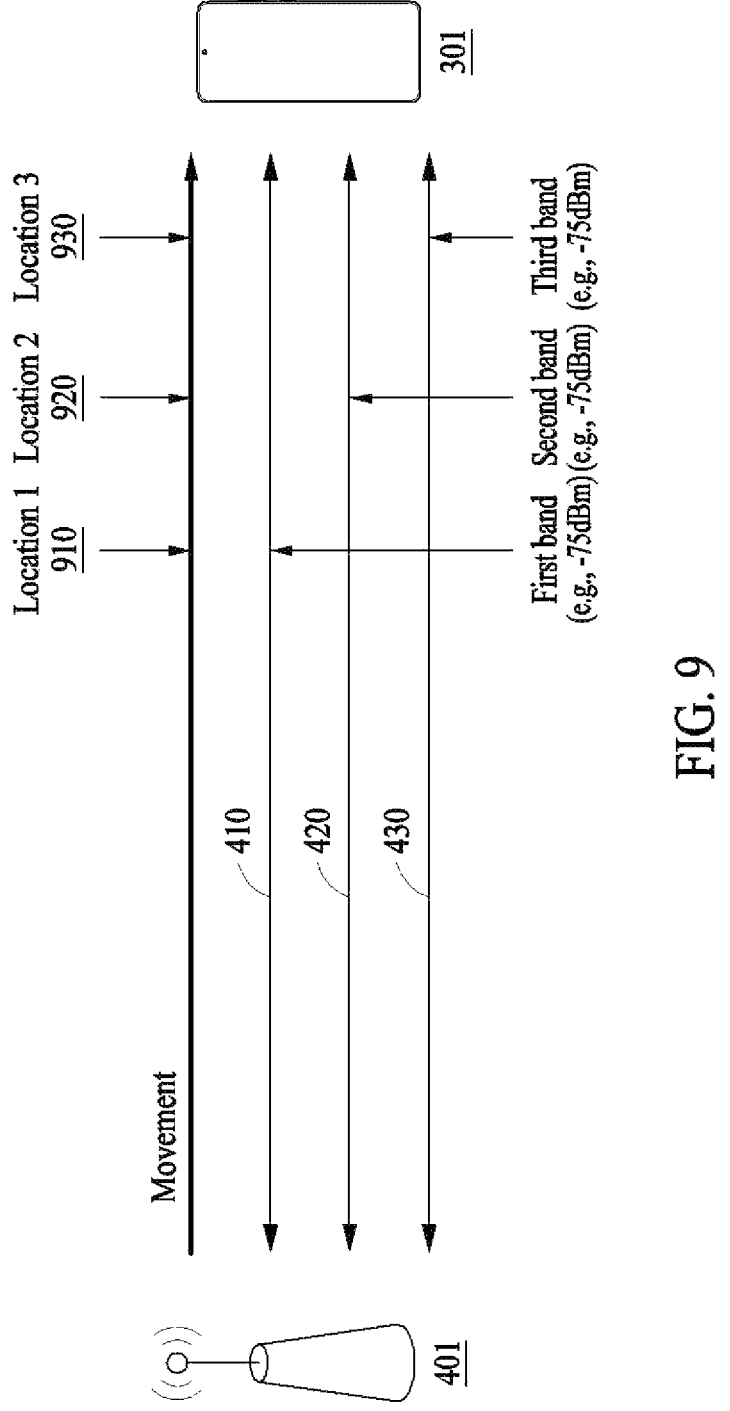
FIG. 9 is a diagram illustrating roaming in a multi-link environment according to one embodiment.

FIG. 9 is a diagram illustrating roaming in a multi-link environment according to one embodiment.

Referring to FIG. 9, according to one embodiment, the STA 301 and the AP 401 may support a multi-link (or multi-band) communication. When the STA 301 accesses the AP 401, a plurality of links (e.g., a first link 410, a second link 420, and/or a third link 430) may be formed between the STA 301 and the AP 401. Although three links are shown in FIG. 9, other number of links can be implemented in other examples. The first link 410 may include one channel defined in the substantially 6 GHz band, the second link 420 may include one channel defined in the substantially 5 GHz band, and the third link 430 may include one channel defined in the substantially 2.4 GHz band.

According to one embodiment, roaming may be triggered in each of the links 410 to 430, which are formed between the STA 301 and the AP 401. The STA 301 may monitor parameters (e.g., the RSSI, the Tx error rate, SNR, and/or the like including combinations and/or multiples thereof) of the AP 401 in each of the links 410 to 430 and may determine that roaming is to be performed when a parameter value of at least one link among each of the monitored links 410 to 430 is less than or equal to the designated threshold value (e.g., an RSSI of less than or equal to substantially −75 dBm). For example, when the STA 301 moves, roaming is triggered for the first link 410 in a first location 910 where the RSSI of the first link 410 of the AP 401 becomes less than or equal to substantially −75 dBm. Similarly, roaming is triggered for the second link 420 in a second location 920 where the RSSI of the second link 420 of the AP 401 becomes less than or equal to substantially −75 dBm. Similarly, roaming is triggered for the third link 430 in a third location 930 where the RSSI of the third link 430 of the AP 401 becomes less than or equal to substantially −75 dBm.

According to one embodiment, the STA 301 may respond to the roaming trigger and determine the state of the plurality of links 410 to 430. The state may include at least one of the number of links related to the roaming trigger, a total link quality, and a link quality of at least one designated link.

According to one embodiment, the STA 301 may differentiate and perform roaming operations according to the state of the plurality of links 410 to 430. The STA 301 may differentiate and perform at least one of a roaming scanning operation and a candidate AP selection operation included in the roaming operation according to the state of the plurality of links 410 to 430.

According to one embodiment, the roaming operation may be differentiated into a plurality of roaming levels according to the state of the plurality of links 410 to 430, and the STA 301 may perform the roaming operation in a roaming level corresponding to the checked state of the plurality of links 410 to 430 among the plurality of roaming levels. At least one of the roaming scanning operation and the AP selection operation included in the roaming operation may be differentiated, divided into a plurality of roaming levels, and defined. In the roaming scanning operation, at least one of whether a roaming scan starts, a roaming scan type, a roaming scan period, and whether data about a designated link is used may be differentiated according to the state of the plurality of links 410 to 430. In the AP selection operation, AP selection criteria (e.g., parameters, such as RSSI, channel utilization, SNR, MAX link rate, channel, band, score, and/or the like including combinations and/or multiples thereof) may be differentiated according to the state of the plurality of links 410 to 430.

According to one embodiment, an example in which in which roaming operations are differentiated and defined as a plurality of roaming levels according to a link (e.g., the number of links in which roaming is triggered) in which roaming is triggered may be as follows. Roaming level 1 may be a case in which roaming of the first link 410 is triggered, roaming level 2 may be a case in which roaming of the first link 410 and the second link 420 is triggered, and roaming level 3 may be a case in which roaming of the first link 410 to the third link 430 is triggered. Examples for roaming levels 1, 2, and 3 are now provided but are not so limited.

1. Roaming Level 1
(1) Perform a partial scan of a triggered link (e.g., the first link 410) "x" times (e.g., at least one time).
(2) Select an AP which has an RSSI that is a threshold (e.g., substantially 20 dBm) or higher than the RSSI of the currently connected AP (e.g., the AP 401) and perform roaming on the AP with the best RSSI among the selected APs.
2. Roaming Level 2
(1) Perform a partial scan of the triggered link (e.g., the first link 410 and the second link 420) for each band sequentially (e.g., perform substantially 6 GHz before substantially 5 GHz) (when scanning substantially 6 GHz or substantially 5 GHz, substantially 6 GHz and substantially 5 GHz are not overlapped because the STA 301 may communicate using substantially 2.4 GHz).
(2) When a candidate AP is not found, sequentially perform a partial scan of untriggered links (e.g., the third link 430 (e.g., substantially 2.4 GHz)).
(3) Sequentially perform a partial scan of the second link 420 and/or the first link 410 periodically (e.g., every substantially 10 seconds).
(4) When performing roaming scan, data is not used for the link (e.g., the link in which roaming is scanned).
(5) Select an AP which has an RSSI that is a threshold (e.g., substantially 10 dBm) or higher than the RSSI of the currently connected AP (e.g., the AP 401) and perform roaming on the AP with the highest RSSI among the selected APs.
3. Roaming Level 3
(1) Sequentially perform a partial scan of the triggered link (e.g., the first link 410, the second link 420, and the third link 430) and subsequently perform a full scan if a candidate AP is not found.
(2) Perform a partial scan periodically (e.g., every substantially 10 seconds) of the third link 430.
(3) When performing roaming scan, data is not used for the link (e.g., the link in which roaming is scanned).

-continued

---
(4) Select an AP which has an RSSI that is a threshold (e.g., substantially 10 dBm) or higher than the RSSI of the currently connected AP (e.g., the AP 401) and perform roaming on the AP with the highest RSSI among the selected APs.

---

The STA 301 may perform an efficient roaming scan by not performing a roaming scan in an unnecessary section or a repeated roaming scan of a link in which roaming is triggered. Also, in an embodiment when roaming is triggered in only a certain link (e.g., the first link 410) in the currently connected AP 401, since the STA 301 may communicate with another link (e.g., two links 420 and 430), roaming is not be performed unless an AP better than (e.g., with a higher RSSI) the currently connected AP 401 is found. As the STA 301 efficiently performs a roaming operation for each roaming level, the STA 301 may provide data to the user without inconvenience.

Figure 10:
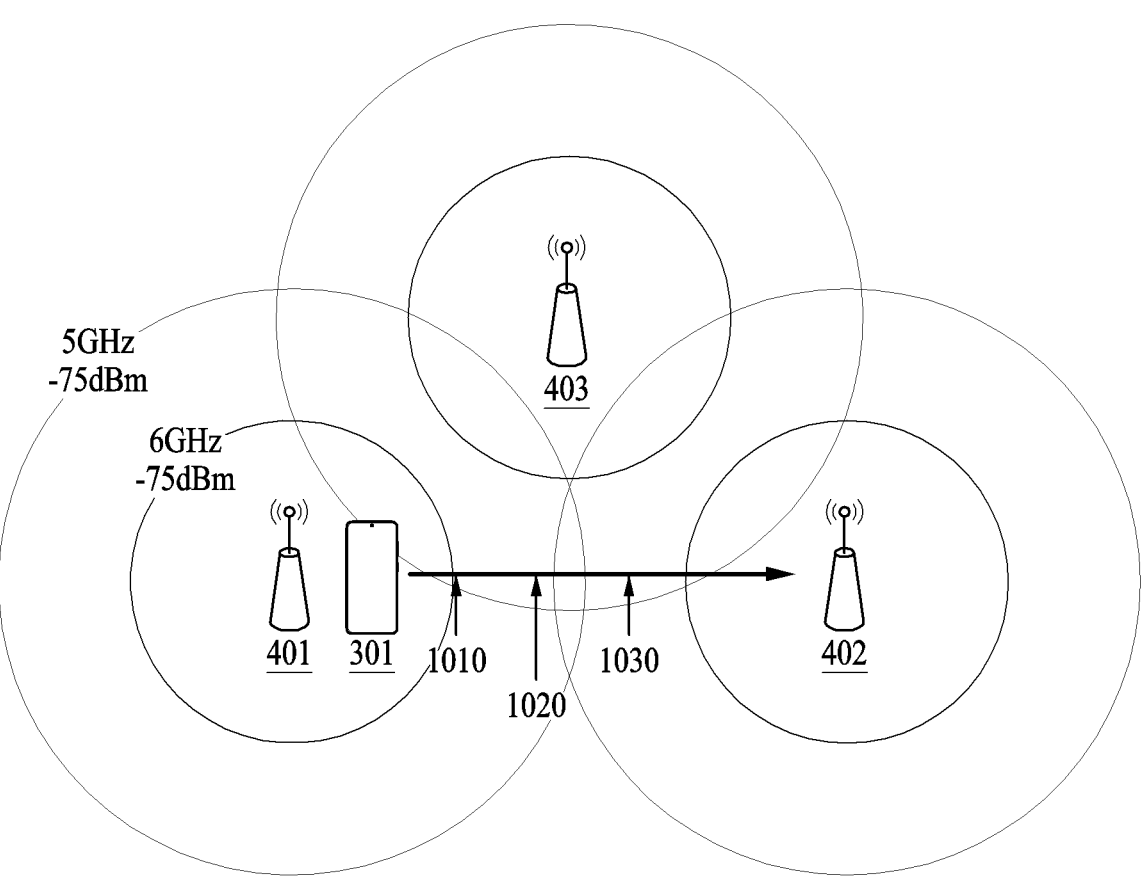
FIG. 10 is a diagram illustrating an example of roaming in a multi-link environment according to one embodiment.

FIG. 10 is a diagram illustrating an example of roaming in a multi-link environment according to one embodiment.

In FIG. 10, for convenient description, only the two bands (e.g., substantially 5 GHz and substantially 6 GHz) of the plurality of links (e.g., the first link 410, the second link 420, and/or the third link 430) generated by the STA 301 and the AP 401 are shown, and it is assumed that the STA 301 performs the roaming operation using roaming level 1 to roaming level 3 as described with respect to FIG. 9.

At a location 1010 of FIG. 10, the STA 301 may trigger the substantially 6 GHz link and operate in roaming level 1. The STA 301 may perform a partial scan of the substantially 6 GHz band and not perform an additional scan. Since the STA 301 has a sufficiently good RSSI (e.g., above a threshold) of the substantially 5 GHz link and the substantially 2.4 GHz link, the network (e.g., wireless fidelity (Wi-Fi)) quality is sufficient and it may determine that roaming is not to be performed.

When the STA 301 moves to location 1020, the STA 301 operates in roaming level 1, although roaming may be continuously triggered in the location 1020, so a candidate AP may be selected when a candidate AP is found which has a threshold RSSI (e.g., substantially 20 dBm higher RSSI). When assuming that the RSSI of the AP 401 and the AP 403 differs by some amount (e.g., substantially 15 dBm) at the location 1020, the STA 301 may not roam to the AP 403 because the RSSI of the AP 403 is not higher than that of the AP 401 by the threshold (e.g., substantially 20 dBm) or more.

When the STA 301 moves to the location 1030, roaming may be triggered in the substantially 5 GHz link. The STA 301 may trigger the substantially 6 GHz link and the substantially 5 GHz link and operate in roaming level 2. The STA 301 may perform a partial scan of the substantially 6 GHz band and the substantially 5 GHz band, and if a candidate AP is not found in the partial scan (e.g., the initial partial scan), the STA 301 may perform a partial scan of the substantially 2.4 GHz band. In the case of the substantially 2.4 GHz band, the STA 301 may scan a wider range, so the STA 301 may obtain additional information about the AP which will be a candidate. The STA 301 may find the AP 402, and at this moment, it may roam to the AP 402, which has a higher RSSI of the substantially 6 GHz or the substantially 5 GHz by a certain amount (e.g., substantially 10 dBm) or more.

Figures 11, 12:
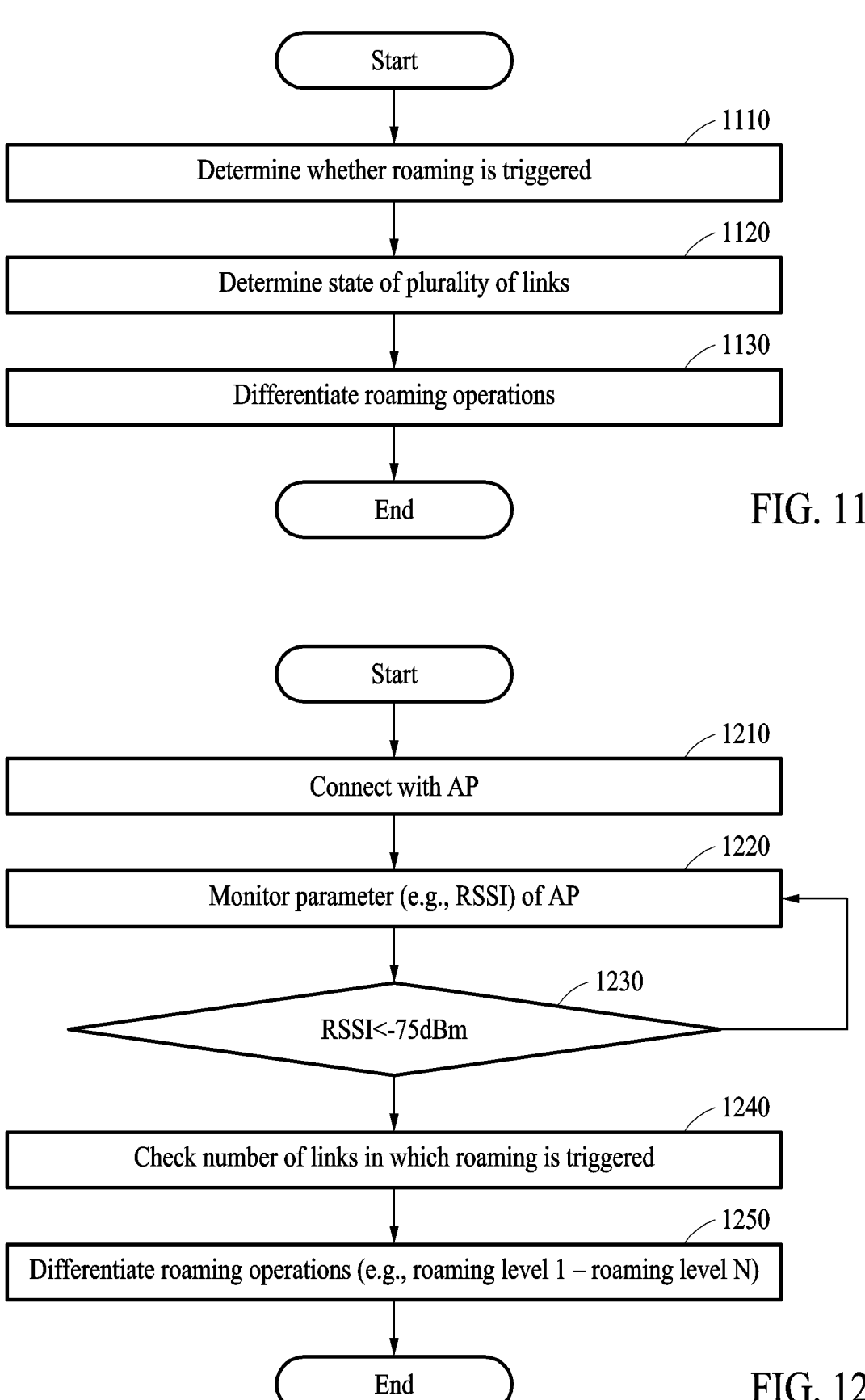
FIG. 11 is a diagram illustrating an example of a roaming operation method in a multi-link environment according to one embodiment.
FIG. 12 is a diagram illustrating another example of a roaming operation method in a multi-link environment according to one embodiment.

FIG. 11 is a diagram illustrating an example of a roaming operation method in a multi-link environment according to one embodiment.

In FIG. 11, operations 1110 to 1130 may be performed sequentially, but not limited thereto. For example, the order of the operations 1110 to 1130 may change and at least two operations may be performed at least in part in parallel.

In operation 1110, the STA (e.g., the STA 301 of FIG. 9) may determine whether roaming is triggered (e.g., whether roaming is to be performed) while forming a plurality of links (e.g., the plurality of links 410 to 430 of FIG. 9) and connecting with the AP (e.g., the AP 401 of FIG. 9). The STA 301 may monitor the parameters (e.g., RSSI, Tx error rate, SNR, and/or the like including combinations and/or multiples thereof) of the AP 401 and may determine that roaming is to be performed if the monitored parameter value is less than or equal to the designated threshold value.

In operation 1120, the STA 301 may respond to the roaming trigger and determine the state of the plurality of links 410 to 430. The state may include at least one of the number of links related to the roaming trigger, a total link quality, and a link quality of at least one designated link, and/or the like including combinations and/or multiples thereof.

In operation 1130, the STA 301 may differentiate and perform roaming operations according to the state of the plurality of links 410 to 430 as described herein.

FIG. 12 is a diagram illustrating another example of a roaming operation method in a multi-link environment according to one embodiment.

FIG. 12 may illustrate a method of the STA (e.g., the STA 301 of FIG. 9) performing the roaming operation differently according to the number of links in which roaming is triggered after roaming is triggered. In FIG. 12, operations 1210 to 1250 may be performed sequentially, but not limited thereto. For example, the order of operations 1210 to 1250 may change and at least two operations may be performed at least in part in parallel.

In operation 1210, the STA 301 may connect to the AP (e.g., the AP 401 of FIG. 9). The STA 301 and the AP 401 may support multi-link (or multi-band) communication. A plurality of links (e.g., the plurality of links 410 to 430 of FIG. 9) may be formed between the STA 301 and the AP 401.

In operation 1220, the STA 301 may monitor parameters (e.g., RSSI) of the AP 401 while forming the plurality of links 410 to 430 and connecting with the AP 401. The STA 301 may monitor the RSSI value of each of the links 410 to 430 of the AP 401. According to one embodiment, the STA 301 may monitor the parameter (e.g., RSSI) of the plurality of links 410 to 430, which is communicatively connected to the AP 401 for a specified period.

In operation 1230, the STA 301 may determine that roaming is to be performed for each of the links 410 to 430 when the RSSI value of at least one link among each of the links 410 to 430 is less than the designated threshold value (e.g., substantially −75 dBm).

In operation 1240, the STA 301 may respond to the roaming trigger and check the number of links in which roaming is triggered.

In operation 1250, the STA 301 may differentiate and perform roaming operations according to the number of links in which roaming is triggered. The roaming level of the roaming operation may be divided and defined in numbers according to the number of links in which roaming is triggered. According to an embodiment, "N" may be the total number of links, but is not limited thereto. For example, the roaming level may be defined by dividing the number of triggered links by range. According to an embodiment, "N" may be a natural number greater than or equal to 2.

According to one embodiment, the STA 301 may perform a roaming operation according to a roaming level corresponding to the number of links in which roaming is triggered.

Figure 13:
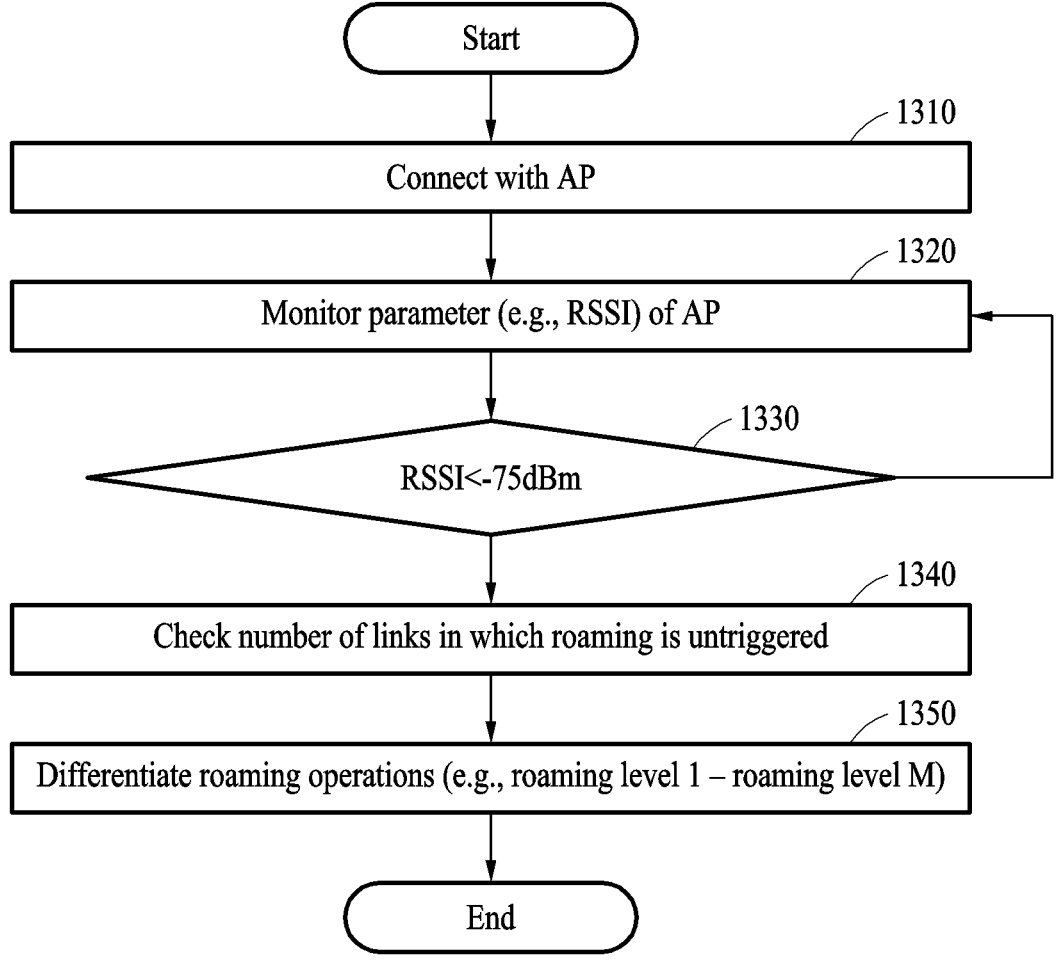
FIG. 13 is a diagram illustrating another example of a roaming operation method in a multi-link environment according to one embodiment.

FIG. 13 is a diagram illustrating another example of a roaming operation method in a multi-link environment according to one embodiment.

Unlike FIG. 12, FIG. 13 illustrates a method of the STA (e.g., the STA 301 of FIG. 9) performing a roaming operation differently according to the number of links in which roaming is currently untriggered after roaming is triggered. In FIG. 13, operations 1310 to 1350 may be performed sequentially, but not limited thereto. For example, the order of operations 1310 to 1350 may change and at least two operations may be performed at least in part in parallel.

In operation 1310, the STA 301 may connect with the AP (e.g., the AP 401 of FIG. 9). The STA 301 and the AP 401 may support multi-link (or multi-band) communication. A plurality of links (e.g., the plurality of links 410 to 430 of FIG. 9) may be formed between the STA 301 and the AP 401.

In operation 1320, the STA 301 may monitor parameters (e.g., RSSI) of the AP 401 while forming the plurality of links 410 to 430 and connecting with the AP 401. The STA 301 may monitor the RSSI value of each of the links 410 to 430 of the AP 401. According to one embodiment, the STA 301 may monitor the parameter (e.g., RSSI) of the plurality of links 410 to 430, which is communicatively connected to the AP 401 for a specified period.

In operation 1330, the STA 301 may determine that roaming is to be performed for each of the links 410 to 430 when the RSSI value of at least one link among each of the links 410 to 430 is less than the designated threshold value (e.g., substantially −75 dBm).

In operation 1340, the STA 301 may respond to the roaming trigger and check the number of links in which roaming is triggered.

In operation 1350, the STA 301 may differentiate and perform roaming operations according to the number of links in which roaming is triggered. The roaming level of the roaming operation may be divided and defined in a plurality of numbers according to the number of links in which roaming is untriggered. According to an embodiment, "M" may be the total number of links, but is not limited thereto. For example, the roaming level may be defined by dividing the number of untriggered links by range. According to an embodiment, "M" may be a natural number greater than or equal to 2.

According to one embodiment, the STA 301 may perform a roaming operation according to a roaming level corresponding to the number of links in which roaming is untriggered.

Figure 14:
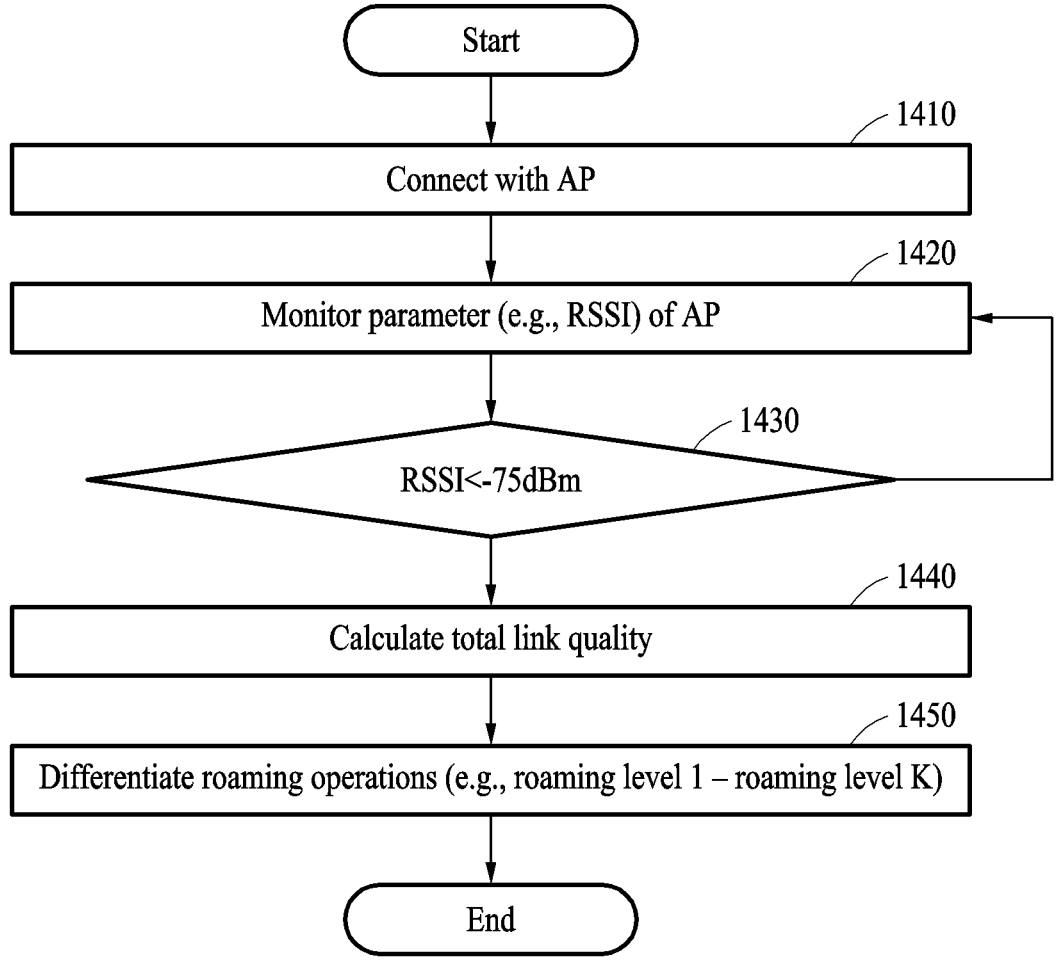
FIG. 14 is a diagram illustrating another example of a roaming operation method in a multi-link environment according to one embodiment.

FIG. 14 is a diagram illustrating another example of a roaming operation method in a multi-link environment according to one embodiment.

FIG. 14 may illustrate a method of the STA (e.g., the STA 301 of FIG. 9) performing a roaming operation differently according to quality (e.g., the total link quality) determined after determining the quality of all links after roaming is triggered. In FIG. 14, operations 1410 to 1450 may be performed sequentially, but not limited thereto. For example, the order of operations 1410 to 1450 may change and at least two operations may be performed at least in part in parallel.

In operation 1410, the STA 301 may connect with the AP (e.g., the AP 401 of FIG. 9). The STA 301 and the AP 401 may support multi-link (or multi-band) communication. A plurality of links (e.g., the plurality of links 410 to 430 of FIG. 9) may be formed between the STA 301 and the AP 401.

In operation 1420, the STA 301 may monitor parameters (e.g., RSSI) of the AP 401 while forming the plurality of links 410 to 430 and connecting with the AP 401. The STA 301 may monitor the RSSI value of each of the links 410 to 430 of the AP 401. According to one embodiment, the STA 301 may monitor the parameter (e.g., RSSI) of the plurality of links 410 to 430, which is communicatively connected to the AP 401 for a specified period.

In operation 1430, the STA 301 may determine that roaming is to be performed for each of the links 410 to 430 when the RSSI value of at least one link among each of the links 410 to 430 is less than the designated threshold value (e.g., substantially −75 dBm).

In operation 1440, the STA 301 may respond to the roaming trigger and calculate the total link quality. The total link quality may be calculated based on the throughput of each of the links 410 to 430. The throughput may be calculated using Equation 1 and may be used as the link quality. The STA 301 may calculate the throughput for each of the links 410 to 430 and may obtain the sum of the calculated throughputs as the total link quality.

$$\text{Estimated Throughput} = \text{MAX Link Rate in Current RSSI} * \text{Number of Spatial Stream} * \text{Channel Utilization} \qquad [\text{Equation 1}]$$

In operation 1450, the STA 301 may differentiate and perform roaming operations according to the total link quality. The roaming level of the roaming operation may be divided and defined in a plurality of numbers according to the total link quality value. According to an embodiment, "K" may be a natural number greater than or equal to 2, and the roaming level may be defined by division into 2 or more by one or more threshold values (or threshold ranges).

According to one embodiment, the STA 301 may perform a roaming operation according to a roaming level corresponding to the total link quality which is calculated (or determined) when roaming is triggered.

Figure 15:
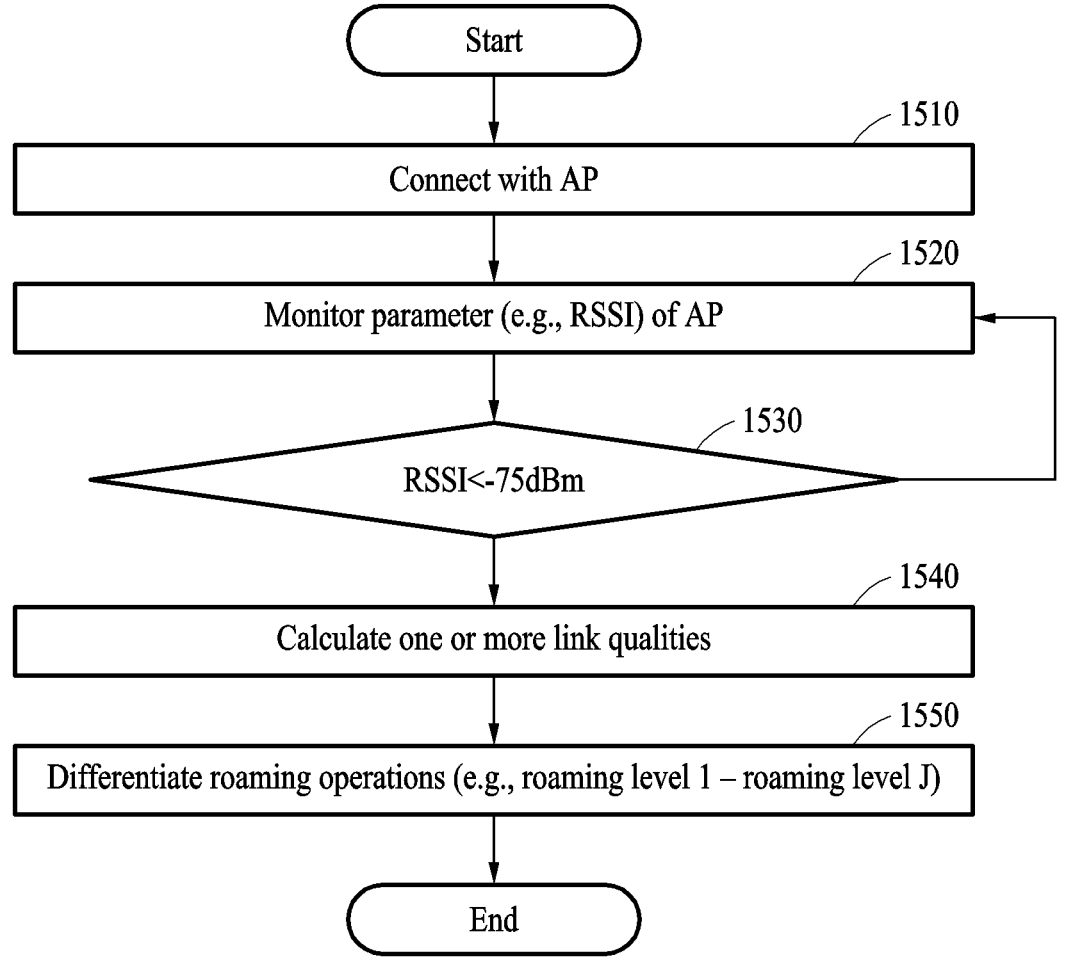
FIG. 15 is a diagram illustrating another example of a roaming operation method in a multi-link environment according to one embodiment.

FIG. 15 is a diagram illustrating another example of a roaming operation method in a multi-link environment according to one embodiment.

FIG. 15 may illustrate a method of the STA (e.g., the STA 301 of FIG. 9) performing a roaming operation differently according to quality (e.g., the quality of one or more links) of a designated link after determining the quality of each link after roaming is triggered. In FIG. 15, operations 1510 to 1550 may be performed sequentially, but not limited thereto. For example, the order of operations 1510 to 1550 may change and at least two operations may be performed at least in part in parallel.

In operation 1510, the STA 301 may connect with the AP (e.g., the AP 401 of FIG. 9). The STA 301 and the AP 401 may support multi-link (or multi-band) communication. A plurality of links (e.g., the plurality of links 410 to 430 of FIG. 9) may be formed between the STA 301 and the AP 401.

In operation 1520, the STA 301 may monitor parameters (e.g., RSSI) of the AP 401 while forming the plurality of links 410 to 430 and connecting with the AP 401. The STA 301 may monitor the RSSI value of each of the links 410 to 430 of the AP 401. According to one embodiment, the STA 301 may monitor the parameter (e.g., RSSI) of the plurality of links 410 to 430, which is communicatively connected to the AP 401 for a specified period.

In operation 1530, the STA 301 may determine that roaming is to be performed for each of the links 410 to 430 when the RSSI value of at least one link among each of the links 410 to 430 is less than the designated threshold value (e.g., substantially −75 dBm).

In operation 1540, the STA 301 may calculate the quality of at least one designated link by responding to the roaming trigger. As described with reference to FIG. 14, the link quality may be calculated through Equation 1. At least one designated link may include at least one link in which roaming is not triggered when roaming is triggered. The STA 301 may calculate the quality of at least one link in which roaming is untriggered.

In operation 1550, the STA 301 may differentiate and perform roaming operations according to the quality of calculated links. The roaming level of the roaming operation may be divided and defined in a plurality of numbers according to the quality value of the calculated links. According to an embodiment, "J" may be a natural number greater than or equal to 2, and the roaming level may be defined by division into 2 or more by one or more threshold values (or threshold ranges).

According to one embodiment, the STA 301 may perform a roaming operation according to a roaming level corresponding to the link quality, which is calculated (or determined) when roaming is triggered.

Figure 16:
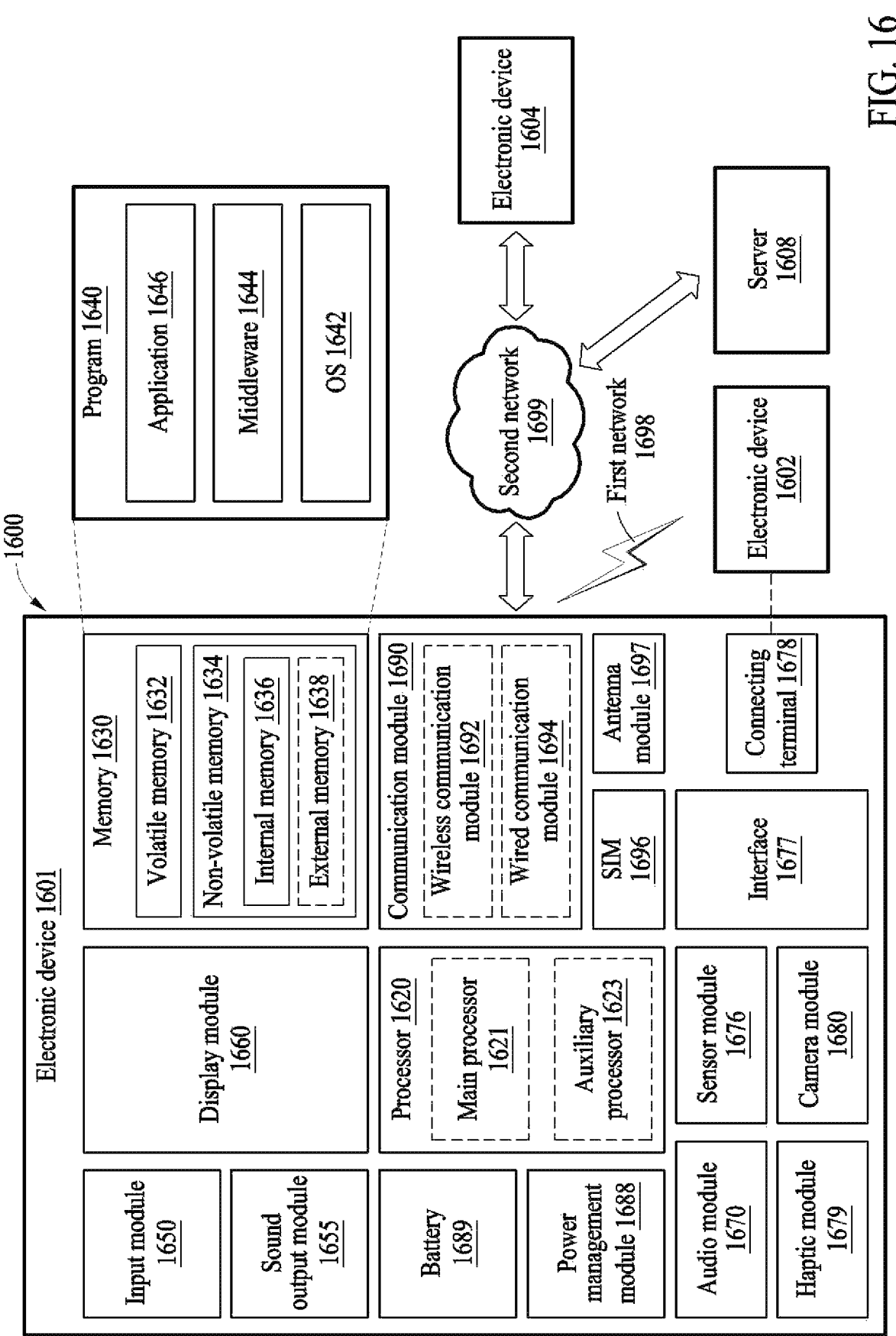
FIG. 16 is a block diagram illustrating an electronic device in a network environment according to one embodiment.

FIG. 16 is a block diagram illustrating an electronic device 1601 in a network environment 1600 according to one embodiment. Referring to FIG. 16, the electronic device 1601 (e.g., the STA 301 of FIG. 3) in the network environment 1600 may communicate with an electronic device 1602 (e.g., the STA 301 of FIG. 3) via a first network 1698 (e.g., a short-range wireless communication network), or communicate with at least one of an electronic device 1604 (e.g., the STA 301 of FIG. 3) or a server 1608 via a second network 1699 (e.g., a long-range wireless communication network). According to one embodiment, the electronic device 1601 may communicate with the electronic device 1604 via the server 1608. According to one embodiment, the electronic device 1601 may include a processor 1620, a memory 1630, an input module 1650, a sound output module 1655, a display module 1660, an audio module 1670, and a sensor module 1676, an interface 1677, a connecting terminal 1678, a haptic module 1679, a camera module 1680, a power management module 1688, a battery 1689, a communication module 1690, a subscriber identification module (SIM) 1696, or an antenna module 1697. In some embodiments, at least one of the components (e.g., the connecting terminal 1678) may be omitted from the electronic device 1601, or one or more other components may be added in the electronic device 1601. In some embodiments, some of the components (e.g., the sensor module 1676, the camera module 1680, or the antenna module 1697) may be integrated as a single component (e.g., the display module 1660).

The processor 1620 may execute, for example, software (e.g., a program 1640) to control at least one other component (e.g., a hardware or software component) of the electronic device 1601 connected to the processor 1620, and may perform various data processing or computation. According to one embodiment, as at least a part of data processing or computation, the processor 1620 may store a command or data received from another component (e.g., the sensor module 1676 or the communication module 1690) in a volatile memory 1632, process the command or the data stored in the volatile memory 1632, and store resulting data in a non-volatile memory 1634. According to one embodiment, the processor 1620 may include a main processor 1621 (e.g., a central processing unit (CPU) or an application processor (AP)), or an auxiliary processor 1623 (e.g., a graphics processing unit (GPU), a neural processing unit (NPU), an image signal processor (ISP), a sensor hub processor, or a communication processor (CP)) that is operable independently from, or in conjunction with the main processor 1621. For example, when the electronic device 1601 includes the main processor 1621 and the auxiliary processor 1623, the auxiliary processor 1623 may be adapted to consume less power than the main processor 1621 or to be specific to a specified function. The auxiliary processor 1623 may be implemented separately from the main processor 1621 or as a part of the main processor 1621.

The auxiliary processor 1623 may control at least some of functions or states related to at least one (e.g., the display module 1660, the sensor module 1676, or the communication module 1690) of the components of the electronic device 1601, instead of the main processor 1621 while the main processor 1621 is in an inactive (e.g., sleep) state or along with the main processor 1621 while the main processor 1621 is an active state (e.g., executing an application). According to one embodiment, the auxiliary processor 1623 (e.g., an ISP or a CP) may be implemented as a portion of another component (e.g., the camera module 1680 or the communication module 1690) that is functionally related to the auxiliary processor 1623. According to one embodiment, the auxiliary processor 1623 (e.g., an NPU) may include a hardware structure specified for artificial intelligence model processing. An artificial intelligence model may be generated by machine learning. Such learning may be performed by, for example, the electronic device 1601 in which artificial intelligence is performed, or performed via a separate server (e.g., the server 1608). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 1630 may store various pieces of data used by at least one component (e.g., the processor 1620 or the sensor module 1676) of the electronic device 1601. The various pieces of data may include, for example, software (e.g., the program 1640) and input data or output data for a command related thereto. The memory 1630 may include the volatile memory 1632 or the non-volatile memory 1634.

The program 1640 may be stored as software in the memory 1630, and may include, for example, an operating system (OS) 1642, middleware 1644, or an application 1646.

The input module 1650 may receive, from outside (e.g., a user) the electronic device 1601, a command or data to be used by another component (e.g., the processor 1620) of the electronic device 1601. The input module 1650 may include, for example, a microphone, a mouse, a keyboard, a key (e.g., a button), or a digital pen (e.g., a stylus pen).

The sound output module 1655 may output a sound signal to the outside of the electronic device 1601. The sound output module 1655 may include, for example, a speaker or a receiver. The speaker may be used for general purposes, such as playing multimedia or playing a recording. The receiver may be used to receive an incoming call. According to one embodiment, the receiver may be implemented separately from the speaker or as a part of the speaker.

The display module 1660 may visually provide information to the outside (e.g., a user) of the electronic device 1601. The display module 1660 may include, for example, a control circuit for controlling a display, a hologram device, or a projector and control circuitry to control its corresponding one of the display, the hologram device, and the projector. According to one embodiment, the display module 1660 may include a touch sensor adapted to detect a touch, or a pressure sensor adapted to measure the intensity of force incurred by the touch.

The audio module 1670 may convert sound into an electrical signal or vice versa. According to one embodiment, the audio module 1670 may obtain the sound via the input module 1650 or output the sound via the sound output module 1655 or an external electronic device (e.g., the electronic device 1602 such as a speaker or a headphone) directly or wirelessly connected to the electronic device 1601.

The sensor module 1676 may detect an operational state (e.g., power or temperature) of the electronic device 1601 or an environmental state (e.g., a state of a user) external to the electronic device 1601, and generate an electrical signal or data value corresponding to the detected state. According to one embodiment, the sensor module 1676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1677 may support one or more specified protocols to be used by the electronic device 1601 to couple with the external electronic device (e.g., the electronic device 1602) directly (e.g., by wire) or wirelessly. According to one embodiment, the interface 1677 may include, for example, a high-definition multimedia interface (HDMI), a universal serial bus (USB) interface, a secure digital (SD) card interface, or an audio interface.

The connecting terminal 1678 may include a connector via which the electronic device 1601 may be physically connected to an external electronic device (e.g., the electronic device 1602). According to one embodiment, the connecting terminal 1678 may include, for example, an HDMI connector, a USB connector, an SD card connector, or an audio connector (e.g., a headphone connector).

The haptic module 1679 may convert an electric signal into a mechanical stimulus (e.g., a vibration or a movement) or an electrical stimulus which may be recognized by a user via their tactile sensation or kinesthetic sensation. According to one embodiment, the haptic module 1679 may include, for example, a motor, a piezoelectric element, or an electric stimulator.

The camera module 1680 may capture a still image and moving images. According to one embodiment, the camera module 1680 may include one or more lenses, image sensors, image signal processors, or flashes.

The power management module 1688 may manage power supplied to the electronic device 1601. According to one embodiment, the power management module 1688 may be implemented as, for example, at least a part of a power management integrated circuit (PMIC).

The battery 1689 may supply power to at least one component of the electronic device 1601. According to one embodiment, the battery 1689 may include, for example, a primary cell which is not rechargeable, a secondary cell which is rechargeable, or a fuel cell.

The communication module 1690 may support establishing a direct (e.g., wired) communication channel or a wireless communication channel between the electronic device 1601 and the external electronic device (e.g., the electronic device 1602, the electronic device 1604, or the server 1608) and performing communication via the established communication channel. The communication module 1690 may include one or more communication processors that are operable independently of the processor 1620 (e.g., an AP) and that support a direct (e.g., wired) communication or a wireless communication. According to one embodiment, the communication module 1690 may include a wireless communication module 1692 (e.g., a cellular communication module, a short-range wireless communication module, or a global navigation satellite system (GNSS) communication module) or a wired communication module 1694 (e.g., a local area network (LAN) communication module, or a power line communication (PLC) module). A corresponding one of these communication modules may communicate with the external electronic device 1604 via the first network 1698 (e.g., a short-range communication network, such as Bluetooth™, wireless-fidelity (Wi-Fi) direct, or infrared data association (IrDA)) or the second network 1699 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 1692 may identify and authenticate the electronic device 1601 in a communication network, such as the first network 1698 or the second network 1699, using subscriber information (e.g., international mobile subscriber identity (IMSI)) stored in the SIM 1696.

The wireless communication module 1692 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1692 may support a high-frequency band (e.g., a mmWave band) to achieve, e.g., a high data transmission rate. The wireless communication module 1692 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 1692 may support various requirements specified in the electronic device 1601, an external electronic device (e.g., the electronic device 1604), or a network system (e.g., the second network 1699). According to one embodiment, the wireless communication module 1692 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1697 may transmit or receive a signal or power to or from the outside (e.g., the external electronic device). According to one embodiment, the antenna module 1697 may include an antenna including a radiating element including a conductive material or a conductive pattern formed in or on a substrate (e.g., a printed circuit board (PCB)). According to one embodiment, the antenna module 1697 may include a plurality of antennas (e.g., array antennas). In such a case, at least one antenna appropriate for a communication scheme used in a communication network, such as the first network 1698 or the second network 1699, may be selected by, for example, the communication module 1690 from the plurality of antennas. The signal or power may be transmitted or received between the communication module 1690 and the external electronic device via the at least one selected antenna. According to one embodiment, another component (e.g., a radio frequency integrated circuit (RFIC)) other than the radiating element may be additionally formed as a part of the antenna module 1697.

According to one embodiment, the antenna module 1697 may form a mmWave antenna module. According to one embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one embodiment, commands or data may be transmitted or received between the electronic device 1601 and the external electronic device 1604 via the server 1608 coupled with the second network 1699. Each of the external electronic devices (e.g., the electronic device 1602 or 1604) may be a device of a same type as or a different type from the electronic device 1601. According to one embodiment, all or some of operations to be executed by the electronic device 1601 may be executed at one or more external electronic devices (e.g., the external devices 1602 and 1604, and the server 1608). For example, if the electronic device 1601 needs to perform a function or a service automatically, or in response to a request from a user or another device, the electronic device 1601, instead of, or in addition to, executing the function or the service, may request one or more external electronic devices to perform at least portion of the function or service. The one or more external electronic devices receiving the request may perform the at least part of the function or service, or an additional function or an additional service related to the request, and may transfer a result of the performance to the electronic device 1601. The electronic device 1601 may provide the result, with or without further processing the result, as at least part of a response to the request. To that end, a cloud computing, distributed computing, mobile edge computing (MEC), or client-server computing technology may be used, for example. The electronic device 1601 may provide ultra low-latency services using, e.g., distributed computing or mobile edge computing. In one embodiment, the external electronic device 1604 may include an Internet-of-things (IoT) device. The server 1608 may be an intelligent server using machine learning and/or a neural network. According to one embodiment, the external electronic device 1604 or the server 1608 may be included in the second network 1699. The electronic device 1601 may be applied to intelligent services (e.g., a smart home, a smart city, a smart car, or healthcare) based on 5G communication technology or IoT-related technology.

The electronic device according to one embodiment may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be understood that one embodiment of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. Terms such as "$1^{st}$", "$2^{nd}$", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used in connection with one embodiment of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to one embodiment, the module may be implemented in a form of an application-predetermined integrated circuit (ASIC).

One embodiment as set forth herein may be implemented as software (e.g., the program 1640) including one or more instructions that are stored in a storage medium (e.g., the internal memory 1636 or the external memory 1638) that is readable by a machine (e.g., the electronic device 1601). For example, a processor (e.g., the processor 1620) of the machine (e.g., the electronic device 1601) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semipermanently stored in the storage medium and where the data is temporarily stored in the storage medium.

According to one embodiment, a method according to one embodiment of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities, and some of the multiple entities may be separately disposed in different components. According to one embodiment, one or more of the above-described components may be omitted, or one or more other components may be added. Alternatively or additionally, a plurality of components (e.g., modules or programs) may be integrated into a single component. In such a case, according to one embodiment, the integrated component may still perform one or more functions of each of the plurality of components in the same or similar manner as they are performed by a corresponding one of the plurality of components before the integration. According to one embodiment, operations performed by the module, the program, or another component may be carried out sequentially, in parallel, repeatedly, or heuristically, or one or more of the operations may be executed in a different order or omitted, or one or more other operations may be added.

According to one embodiment, an electronic device (e.g., the STA 301 of FIG. 3 or the electronic device 1601 of FIG. 16) may include a wireless communication module (e.g., the wireless communication module 1692 of FIG. 16) configured to transceive a wireless signal, a processor (e.g., the processor 1620 of FIG. 16) operatively connected to the wireless communication module, and a memory (e.g., the memory 1630 of FIG. 16) electrically connected to the processor and configured to store instructions executable by the processor, wherein, when the instructions are executed by the processor, the processor is configured to determine (e.g., operation 1110 of FIG. 11) whether roaming is triggered by a roaming trigger while forming a plurality of links (e.g., the plurality of links 410 to 430 of FIG. 4) with and connected to an AP (e.g., the AP 401 of FIG. 3), determine (e.g., operation 1120 of FIG. 11) a state of the plurality of links by responding to the roaming trigger, and differentiate and perform (e.g., operation 1130 of FIG. 11) roaming operations according to the state of the plurality of links.

According to one embodiment, the processor is configured to determine whether roaming is triggered by monitoring a parameter of the AP.

According to one embodiment, the state of the plurality of links may include at least one of a number of links related to the roaming trigger, a total link quality, and a link quality of a designated link.

According to one embodiment, the total link quality and the link quality of the designated link may be based on a throughput of a link.

According to one embodiment, the designated link may include at least one link in which roaming is untriggered.

According to one embodiment, the number of links related to the roaming trigger may include a number of links in which roaming is triggered and a number of links in which roaming is untriggered.

According to one embodiment, the processor is configured to differentiate and perform at least one of a roaming scanning operation and an AP selection operation included in the roaming operations according to the state of the plurality of links.

According to one embodiment, the processor is configured to differentiate at least one of whether the roaming scanning operation starts, a roaming scan type, a roaming scan period, and whether data about a designated link is used, based on the state of the plurality of links, and may perform the roaming scanning operation.

According to one embodiment, the processor is configured to differentiate AP selection criteria according to the state of the plurality of links and perform the AP selection operation.

According to one embodiment, the processor may be implemented as a communication processor or an application processor.

According to one embodiment, a method of operating an electronic device (e.g., the STA 301 of FIG. 3 or the electronic device 1601 of FIG. 16) may include determining (e.g., operation 1110 of FIG. 11) whether roaming is triggered by a roaming trigger while forming a plurality of links (e.g., the plurality of links 410 to 430 of FIG. 4) with and connected to an AP (e.g., the AP 401 of FIG. 3), determining (e.g., operation 1120 of FIG. 11) a state of the plurality of links by responding to the roaming trigger, and differentiating and performing (e.g., operation 1130 of FIG. 11) roaming operations according to the state of the plurality of links.

According to one embodiment, the determining of whether roaming is triggered may include determining whether the roaming is triggered by monitoring a parameter of the AP.

According to one embodiment, the state of the plurality of links may include at least one of a number of links related to the roaming trigger, total link quality, and link quality of a designated link.

According to one embodiment, the total link quality and the link quality of the designated link may be based on a throughput of a link.

According to one embodiment, the designated link may include at least one link in which roaming is untriggered.

According to one embodiment, the number of links related to the roaming trigger may include a number of links in which roaming is triggered and a number of links in which roaming is untriggered.

According to one embodiment, the differentiating and performing of the roaming operations may include differentiating and performing at least one of a roaming scanning operation and an AP selection operation included in the roaming operation according to the state of the plurality of links.

According to one embodiment, the differentiating and performing of the at least one of the roaming scanning operation and the AP selection operation according to the state of the plurality of links may include differentiating at least one of whether roaming scan starts, a roaming scan type, a roaming scan period, and whether data about a designated link is used, based on the state of the plurality of links and performing the roaming scanning operation.

According to one embodiment, the differentiating and performing of the at least one of the roaming scanning operation and the AP selection operation according to the state of the plurality of links may include differentiating AP selection criteria according to the state of the plurality of links and performing the AP selection operation.

According to one embodiment, the method of operating the electronic device may be performed by a communication processor or an application processor.

According to one embodiment, a method includes connecting (e.g., operations 1210, 1310, 1410, 1510 of FIGS. 12-15) an electronic device (e.g., the STA 301 of FIG. 3 or the electronic device 1601 of FIG. 16) to an access point (e.g., the AP 401 of FIG. 3) to establish a plurality of links (e.g., the plurality of links 410 to 430 of FIG. 4) between the electronic device and the access point; monitoring (e.g., operations 1220, 1320, 1420, 1520 of FIGS. 12-15) a parameter (e.g., RSSI, etc.) of the access point; determining (e.g., operations 1230, 1330, 1430, 1530 of FIGS. 12-15) whether the parameter satisfies a threshold; responsive to determining that the parameter fails to satisfy the threshold, evaluating (e.g., operations 1240, 1340, 1440, 1540 of FIGS. 12-15) a link of the plurality of links, wherein evaluating the link of the plurality of links comprises at least one of checking a number of links in which roaming is triggered (e.g., operation 1240), checking a number of links in which roaming is untriggered (e.g., operation 1340), calculating a total link quality (e.g., operation 1440), and calculating a link quality (e.g., operation 1540); and differentiating (e.g., operations 1250, 1350, 1450, 1550 of FIGS. 12-15) roaming operations.

What is claimed is:

1. An electronic device comprising:
a wireless communication module configured to transceive a wireless signal;
a processor operatively connected to the wireless communication module; and
a memory electrically connected to the processor and configured to store instructions executable by the processor,
wherein, when the instructions are executed by the processor, the processor is configured to:
determine whether roaming is triggered while connected to an access point (AP) via a plurality of links;
in response to a roaming trigger, determine a state of the plurality of links; and
perform differentiated roaming operations according to the state of the plurality of links, and
wherein the state of the plurality of links comprises at least one of a number of links related to the roaming trigger or a link quality based on a throughput of a link.

2. The electronic device of claim 1, wherein the processor is configured to determine whether the roaming is triggered by monitoring a parameter of the AP.

3. The electronic device of claim 1, wherein the link quality includes at least one of, a total link quality or a link quality of a designated link.

4. The electronic device of claim 3, wherein the designated link comprises a link in which roaming is untriggered.

5. The electronic device of claim 1, wherein the number of links related to the roaming trigger comprises a number of links in which roaming is triggered and a number of links in which roaming is untriggered.

6. The electronic device of claim 1, wherein the processor is configured to perform at least one of a roaming scanning operation or an AP selection operation included in the roaming operations differently according to the state of the plurality of links.

7. The electronic device of claim 6, wherein the processor is configured to differentiate at least one of whether the roaming scanning operation starts, a roaming scan type, a roaming scan period, or whether data about a designated link is used, based on the state of the plurality of links, and to perform the roaming scanning operation.

8. The electronic device of claim 6, wherein the processor is configured to differentiate AP selection criteria according to the state of the plurality of links and perform the AP selection operation.

9. The electronic device of claim 1, wherein the processor is implemented as a communication processor or an application processor.

10. A method of operating an electronic device, the method comprising:
determining whether roaming is triggered while connected to an access point (AP) via a plurality of links;
in response to a roaming trigger, determining a state of the plurality of links; and
performing differentiated roaming operations according to the state of the plurality of links, and
wherein the state of the plurality of links comprises at least one of a number of links related to the roaming trigger or a link quality based on a throughput of a link.

11. The method of claim 10, wherein the determining of whether roaming is triggered comprises determining whether the roaming is triggered by monitoring a parameter of the AP.

12. The method of claim 10, wherein the link quality includes at least one of a total link quality; or a link quality of a designated link.

13. The method of claim 10, wherein the designated link comprises a link in which roaming is untriggered.

14. The method of claim 12, wherein the number of links related to the roaming trigger comprises a number of links in which roaming is triggered and a number of links in which roaming is untriggered.

15. The method of claim 10, wherein the differentiating and performing of the roaming operations comprises performing at least one of a roaming scanning operation and an AP selection operation included in the roaming operation differently according to the state of the plurality of links.

16. The method of claim 15, wherein the performing of the at least one of the roaming scanning operation and the AP selection operation according to the state of the plurality of links comprises differentiating at least one of whether roaming scan starts, a roaming scan type, a roaming scan period, or whether data about a designated link is used, based on the state of the plurality of links and performing the roaming scanning operation.

17. The method of claim 15, wherein the differentiating and performing of the at least one of the roaming scanning operation and the AP selection operation according to the state of the plurality of links comprises differentiating AP selection criteria according to the state of the plurality of links and performing the AP selection operation.

18. A method comprising:

connecting an electronic device to an access point to establish a plurality of links between the electronic device and the access point;

monitoring a parameter of the access point;

determining whether the parameter satisfies a threshold;

responsive to determining that the parameter fails to satisfy the threshold, evaluating a link of the plurality of links, wherein evaluating the link of the plurality of links comprises at least one of checking a number of links in which roaming is triggered, checking a number of links in which roaming is untriggered, calculating a total link quality, or calculating a link quality; and differentiating roaming operations.

* * * * *